(12) United States Patent
Nagata et al.

(10) Patent No.: US 9,136,922 B2
(45) Date of Patent: *Sep. 15, 2015

(54) FEEDBACK METHOD AND MOBILE TERMINAL APPARATUS

(75) Inventors: Satoshi Nagata, Tokyo (JP); Yuichi Kakishima, Tokyo (JP); Hidekazu Taoka, Tokyo (JP); Katsutoshi Kusume, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 261 days.

This patent is subject to a terminal disclaimer.

(21) Appl. No.: 13/877,573

(22) PCT Filed: Oct. 3, 2011

(86) PCT No.: PCT/JP2011/072757
§ 371 (c)(1),
(2), (4) Date: May 14, 2013

(87) PCT Pub. No.: WO2012/046689
PCT Pub. Date: Apr. 12, 2012

(65) Prior Publication Data
US 2013/0230007 A1 Sep. 5, 2013

(30) Foreign Application Priority Data
Oct. 4, 2010 (JP) .................. 2010-224821

(51) Int. Cl.
*H04B 17/00* (2015.01)
*H04W 60/00* (2009.01)
(Continued)

(52) U.S. Cl.
CPC ............ *H04B 7/0417* (2013.01); *H04B 7/0478* (2013.01); *H04L 1/0026* (2013.01);
(Continued)

(58) Field of Classification Search
USPC ......................................................... 370/329
See application file for complete search history.

(56) References Cited

U.S. PATENT DOCUMENTS

2009/0262695 A1* 10/2009 Chen et al. .................... 370/329
2010/0315969 A1* 12/2010 Jongren et al. ................ 370/252
(Continued)

FOREIGN PATENT DOCUMENTS

JP          4938122 B2    5/2012
WO     2012/036513 A1    3/2012

OTHER PUBLICATIONS

Written Opinion of the International Searching Authority issued in PCT/JP2011/072757 mailed on Nov. 15, 2011 (5 pages).
(Continued)

*Primary Examiner* — Edan Orgad
*Assistant Examiner* — Sithu Ko
(74) *Attorney, Agent, or Firm* — Osha Liang LLP

(57) ABSTRACT

The present invention makes it possible to feed back PMIs that are required to generate precoding weights, while securing improvement of throughput performance, in downlink MIMO transmission using a plurality of transmitting antennas. With the present invention, in a mode to include a PTI (Precoder Type Indicator) in a PUCCH and feedback the PTI to a radio base station apparatus for downlink MIMO transmission using a plurality of transmitting antennas, the transmission cycle of feedback information corresponding to report 2 and report 3 when the value of the PTI is 0 are made different from the transmission cycle of feedback information corresponding to report 2 and report 3 when PTI=1 and the former feedback information and the latter feedback information are multiplexed, and the multiplexed signal is transmitted to the radio base station apparatus by the PUCCH.

11 Claims, 15 Drawing Sheets

(51) Int. Cl.
- *H04B 7/04* (2006.01)
- *H04L 1/00* (2006.01)
- *H04L 25/03* (2006.01)
- *H04B 7/06* (2006.01)
- *H04L 25/02* (2006.01)
- *H04W 16/28* (2009.01)
- *H04W 24/10* (2009.01)

(52) U.S. Cl.
CPC ........ *H04L1/0031* (2013.01); *H04L 25/03343* (2013.01); *H04L 25/03898* (2013.01); *H04B 7/0452* (2013.01); *H04B 7/063* (2013.01); *H04B 7/065* (2013.01); *H04B 7/0636* (2013.01); *H04B 7/0639* (2013.01); *H04L 25/0204* (2013.01); *H04W 16/28* (2013.01); *H04W 24/10* (2013.01)

(56) References Cited

U.S. PATENT DOCUMENTS

| | | | |
|---|---|---|---|
| 2012/0063500 A1* | 3/2012 | Wang et al. | 375/224 |
| 2012/0069917 A1* | 3/2012 | Liu et al. | 375/259 |
| 2013/0230007 A1 | 9/2013 | Nagata et al. | |

OTHER PUBLICATIONS

International Preliminary Report on Patentability from PCT/JP2011/072757 issued on May 8, 2013 (6 pages).

3GPP TS 36.213 V10.0.1; "3rd Generation Partnership Project; Technical Specification Group Radio Access Network; Evolved Universal Terrestrial Radio Access (E-UTRA); Physical layer procedures (Release 10)"; Dec. 2010 pp. 1-2 and pp. 44-49 (8 pages).

Office Action in counterpart Japanese Patent Application No. 2012-000556, mailed Aug. 5, 2014 (6 pages).

Office Action issued in corresponding Japanese Application No. 2012-000556, mailed Oct. 21, 2014 (4 pages).

International Search Report issued in PCT/JP2011/072757 mailed Nov. 15, 2011 (4 pages).

Alcatel-Lucent et al., "Way Forward on CSI Feedback for Rel. 10 DL MIMO", 3GPP TSG RAN WG1 62; R1-104476; Madrid, Spain; Aug. 23-27, 2010 (5 pages).

3GPP TR 25.913 V9.0.0; "3rd Generation Partnership Project; Technical Specification Group Radio Access Network; Requirements for Evolved UTRA (E-UTRA) and Evolved UTRAN (E-UTRAN) (Release 9)"; Dec. 2009 (18 pages).

* cited by examiner

FEEDBACK METHOD AND MOBILE TERMINAL APPARATUS

TECHNICAL FIELD

The present invention relates to a feedback method and a mobile terminal apparatus. More particularly, the present invention relates to a feedback method and a mobile terminal apparatus that support multi-antenna transmission.

BACKGROUND ART

In a UMTS (Universal Mobile Telecommunications System) network, for the purposes of improving spectral efficiency and improving data rates, system features based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing high-speed data rates, providing low delay and so on, long-term evolution (LTE) has been under study.

In the third-generation mobile communication system, it is possible to achieve a transmission rate of maximum approximately 2 Mbps on the downlink by using a fixed band of approximately 5 MHz. Meanwhile, in the LTE system, it is possible to achieve a transmission rate of about maximum 300 Mbps on the downlink and about 75 Mbps on the uplink by using a variable band which ranges from 1.4 MHz to 20 MHz. Furthermore, in the UMTS network, for the purpose of achieving further broadbandization and higher speed, successor systems to LTE have been under study (for example, LTE Advanced (LTE-A)). For example, in LTE-A, there is a plan to expand the maximum system band for LTE specifications, which is 20 MHz, to approximately 100 MHz. Also, there is a plan to increase the maximum number of transmitting antennas for LTE specifications, which is four transmitting antennas, to eight transmitting antennas.

Also, in a system of the LTE scheme (LTE system), a MIMO (Multi Input Multi Output) system is proposed (see, for example, non-patent literature 1), as a radio communication technique to transmit and receive data by a plurality of antennas and improve the data rate (spectral efficiency). In the MIMO system, a plurality of transmitting/receiving antennas are provided in the transmitter/receiver, so that different transmission information sequences are transmitted from different transmitting antennas, at the same time. On the other hand, on the receiver side, taking advantage of the fact that fading variation is produced between transmitting/receiving antennas, by separating and detecting the information sequences that have been transmitted at the same time, it is possible to increase the data rate (spectral efficiency).

Also, in the LTE system, single-user MIMO (SU-MIMO), in which all the transmission information sequences that are transmitted from different transmitting antennas at the same time are directed to the same user, and multiple-user MIMO (MU-MIMO), in which transmission information sequences that are transmitted from different transmitting antennas are directed to different users, are defined. In these SU-MIMO transmission and MU-MIMO transmission, on the receiver side, an optimal PMI is selected from a codebook, in which a plurality of amounts of phase/amplitude control to be set in the antennas of the transmitter (precoding weights) and PMIs (Precoding Matrix Indicators) to be associated with the precoding weights, are defined on a per rank basis, and fed back to the transmitter, and, furthermore, an RI (Rank Indicator) to indicate an optimal rank is selected and fed back to the transmitter. On the transmitter side, based on the PMI and RI that are fed back from the receiver, the precoding weight for each transmitting antenna is specified, precoding is performed, and transmission information sequences are transmitted.

CITATION LIST

Non-Patent Literature

Non-Patent Literature 1: 3GPP TR 25.913 "Requirements for Evolved UTRA and Evolved UTRAN"

SUMMARY OF THE INVENTION

Technical Problem

As described above, in LTE-A, there is a plan to expand the maximum number of transmitting antennas to eight transmitting antennas. Then, in downlink MIMO transmission using eight transmitting antennas, there is an agreement to feed back two types of PMIs that are selected from two different codebooks. These two types of PMIs are required to be fed back to the base station apparatus efficiently, from the perspective of improving throughput performance.

The present invention has been made in view of the above, and it is therefore an object of the present invention to provide a feedback method and a mobile terminal apparatus whereby it is possible to feed back PMIs that are required to generate precoding weights, while securing improvement of throughput performance, in downlink MIMO transmission using a plurality of transmitting antennas.

Solution to Problem

A feedback method according to the present invention is a feedback method of including a PTI (Precoder Type Indicator) in a physical uplink control channel and feeding back the PTI to a radio base station apparatus for downlink MIMO transmission using a plurality of transmitting antennas, and this feedback method includes the steps of: making a transmission cycle of feedback information corresponding to report 2 and report 3 when a value of the PTI is 0 different from a transmission cycle of feedback information corresponding to report 2 and report 3 when PTI=1 and multiplexing the former feedback information and the latter feedback information; and transmitting the multiplexed signal to the radio base station apparatus by the physical uplink control channel.

A mobile terminal apparatus according to the present invention includes: a multiplexing section that, in a mode to include a PTI (Precoder Type Indicator) in a physical uplink control channel and feed back the PTI to a radio base station apparatus for downlink MIMO transmission using a plurality of transmitting antennas, makes a transmission cycle of feedback information corresponding to report 2 and report 3 when a value of the PTI is 0 different from a transmission cycle of feedback information corresponding to report 2 and report 3 when PTI=1 and multiplexes the former feedback information and the latter feedback information; and a transmission section that transmits the multiplexed signal to the radio base station apparatus by the physical uplink control channel.

Technical Advantageous of the Invention

According to the present invention, in downlink MIMO transmission using a plurality of transmitting antennas, it is possible to feed back PMIs that are required to generate precoding weights, while securing improvement of throughput performance.

DESCRIPTION OF EMBODIMENTS

Figure 1:
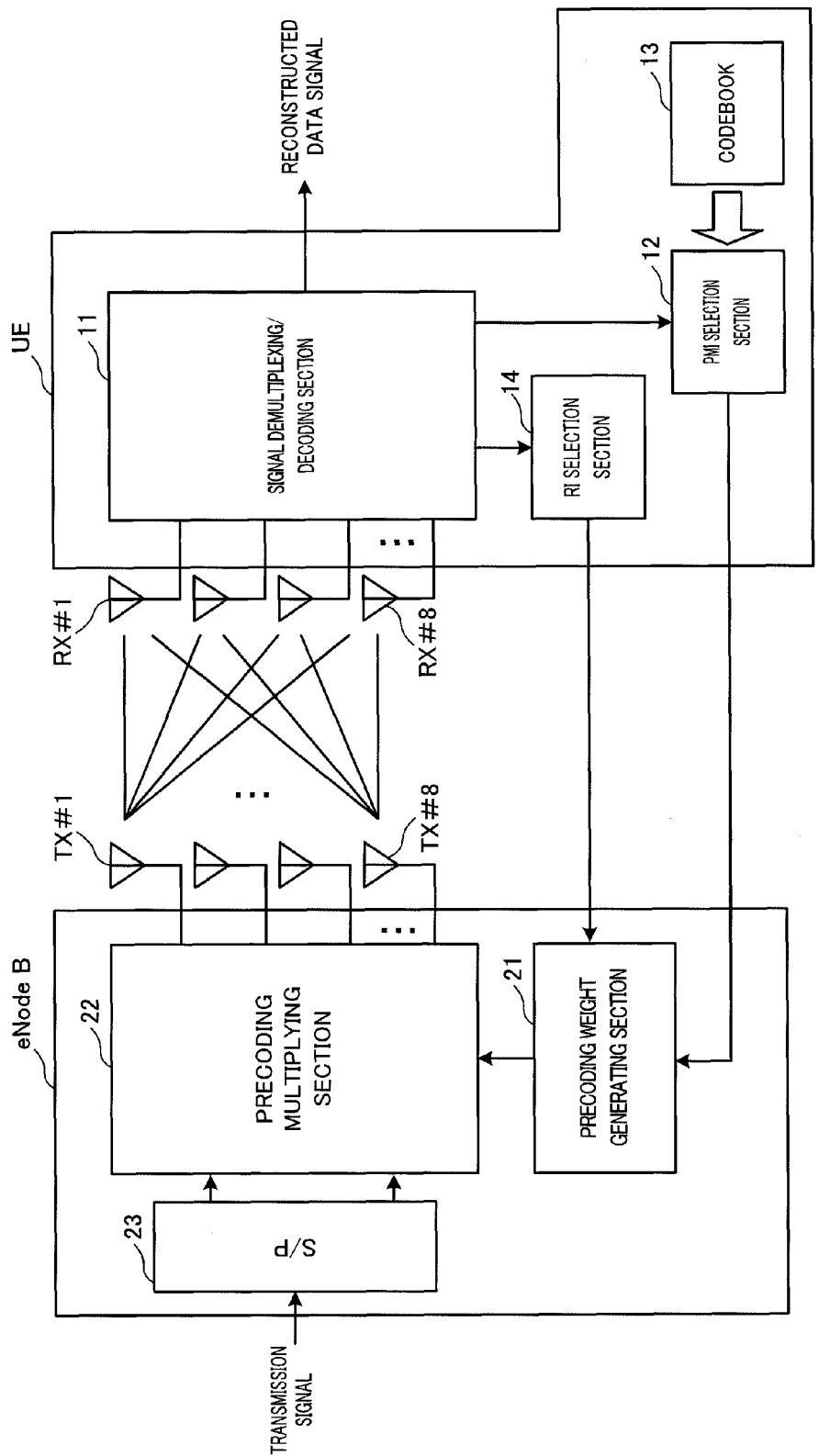
FIG. 1 is a conceptual diagram of a MIMO system adopting a feedback method according to the present invention.

Now, embodiments of the present invention will be described below in detail with reference to the accompanying drawings. First, precoding in downlink MIMO transmission that is performed in the LTE-A system will be described based on the MIMO system shown in FIG. 1. FIG. 1 is a conceptual diagram of a MIMO system adopting a feedback method according to the present invention. Note that, with the MIMO system shown in FIG. 1, a case is illustrated where a radio base station apparatus (hereinafter simply referred to as "base station apparatus") eNodeB and a mobile terminal apparatus UE each have eight antennas.

In precoding in downlink MIMO transmission, a mobile terminal apparatus UE measures the amount of channel variation using a received signal from each antenna, and, based on the measured amount of channel variation, selects a PMI (Precoding Matrix Indicator) and an RI (Rank Indicator) that correspond to the amount of phase/amplitude control (precoding weight) that maximizes the throughput (or the received SINR (Signal to Interference and Noise Ratio)) after transmission data from each transmitting antenna of the base station apparatus eNodeB is combined. Then, the selected PMI and RI are fed back to the base station apparatus eNodeB on the uplink with a CQI (Channel Quality Indicator) which represents channel quality information. The base station apparatus eNodeB performs precoding of transmission data based on the PMI and RI that are fed back from the mobile terminal apparatus UE, and, after that, performs information transmission from each antenna.

In the mobile terminal apparatus UE shown in FIG. 1, a signal demultiplexing/decoding section 11 demultiplexes and decodes the control channel signal and data channel signal included in the received signals received via receiving antennas RX #1 to RX #8. By performing the decoding process in the signal demultiplexing/decoding section 11, the data channel signal for the mobile terminal apparatus UE is reconstructed. A PMI selection section 12 selects a PMI according to the channel state estimated by a channel estimation section, which is not illustrated. At this time, the PMI selection section 12 selects an optimal PMI from a codebook 13, in which N precoding weights (precoding matrix) that are known at both the mobile terminal apparatus UE and the base station apparatus eNodeB per rank, and PMIs associated with these precoding weights are defined. An RI selection section 14 selects an RI according to the channel state estimated by the channel estimation section. These PMI and RI are transmitted to the base station apparatus eNodeB, with a CQI which represents channel quality information, as feedback information.

Meanwhile, in the base station apparatus eNodeB shown in FIG. 1, a precoding weight generating section 21 generates precoding weights based on the PMI and RI that are fed back from the mobile terminal apparatus UE. A precoding multiplying section 22 controls (shifts) the phase/amplitude, for each of transmitting antennas TX #1 to TX #8, by multiplying the transmission signal having been subjected to parallel conversion in a serial/parallel conversion section (S/P) 23, by precoding weights. By this means, transmission data to which a phase/amplitude shift has been applied is transmitted from eight transmitting antennas TX #1 to TX #8.

Here, in such downlink MIMO transmission, the method of feeding back channel information (PMI/CQI/RI: hereinafter referred to as "feedback information" as appropriate) from the mobile terminal apparatus to the base station apparatus eNodeB will be described. FIG. 2 provides diagrams for explaining a method of feeding back feedback information from the mobile terminal apparatus UE to the base station apparatus eNodeB through a PUCCH (Physical Uplink Control Channel) in downlink MIMO transmission. FIG. 2 shows cases of feeding back feedback information periodically (hereinafter referred to as "periodic feedback").

Figure 2A:
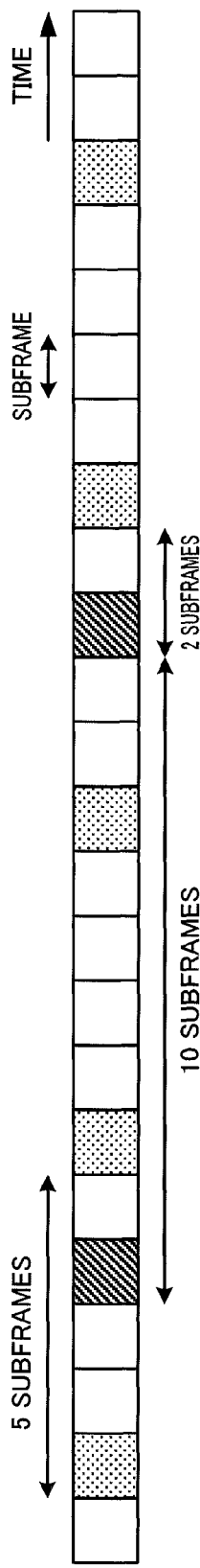
FIG. 2 provides diagrams to explain PMI/CQI/RI feedback using a PUCCH.
Figure 2B:
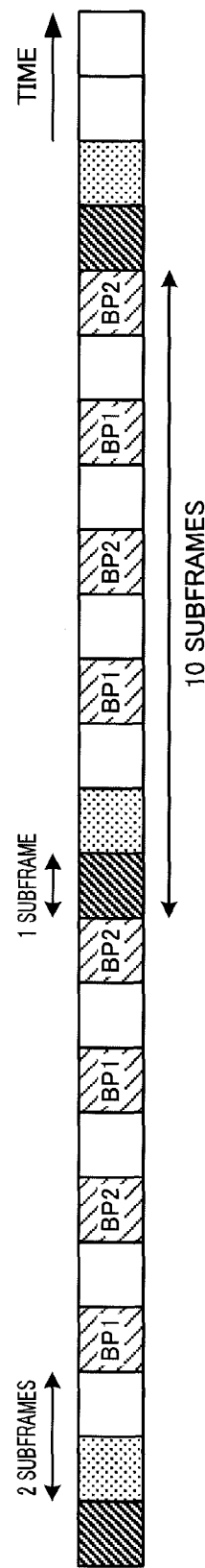

In periodic feedback, as shown in FIG. 2A, there is a mode to feed back a wideband CQI (WB-CQI) and a wideband PMI (WB-PMI), and an RI, in separate subframes, and, as shown FIG. 2B, there is a mode to feed back a WB-CQI and a WB-PMI, an RI, and a selected subband CQI (SB-CQI), in separate subframes. In the modes shown in FIG. 2A and FIG. 2B, feedback information (PMI/CQI and RI) is fed back using the PUCCH.

In the mode shown in FIG. 2A, the WB-PMI and WB-CQI, and the RI, are fed back in different subframes (TTIs: Transmission Time Intervals). FIG. 2A shows a case where the feedback mode of channel information of the PUCCH is mode 1-1, the cycle of the WB-PMI/WB-CQI is five subframes, and the cycle of the RI is twice the cycle of the WB-PMI/WB-CQI (ten subframes), and the subframes to feed back the RI are two subframes offset from the subframes to feed back the WB-PMI/WB-CQI. In this case, the WB-PMI/WB-CQI and the RI are separately encoded and fed back.

Meanwhile, in the mode shown in FIG. 2B, the WB-PMI and the WB-CQI, the RI, and the SB-CQI are fed back in different subframes (TTIs). FIG. 2B shows a case where the feedback mode of channel information of the PUCCH is mode 2-1, the cycle of the WB-PMI/WB-CQI (SB-CQI) is two subframes, the cycle of the RI is five times (ten subframes) the cycle of the WB-PMI/WB-CQI, and the subframes to feed back the RI are one subframe offset from the subframes to feed back the WB-PMI/WB-CQI.

Also, FIG. 2B shows a case where the number of subbands (bandwidth parts (BPs)) is two, the offset of subframes to feed back the SB-CQI with respect to subframes to feed back the WB-PMI/WB-CQI is two subframes, and, during a feedback cycle of the WB-PMI/WB-CQI, the SB-CQI of the same subband is fed back twice. In this case, the WB-PMI/WB-CQI, the RI, and the SB-CQI are separately encoded and fed back.

Figure 3:
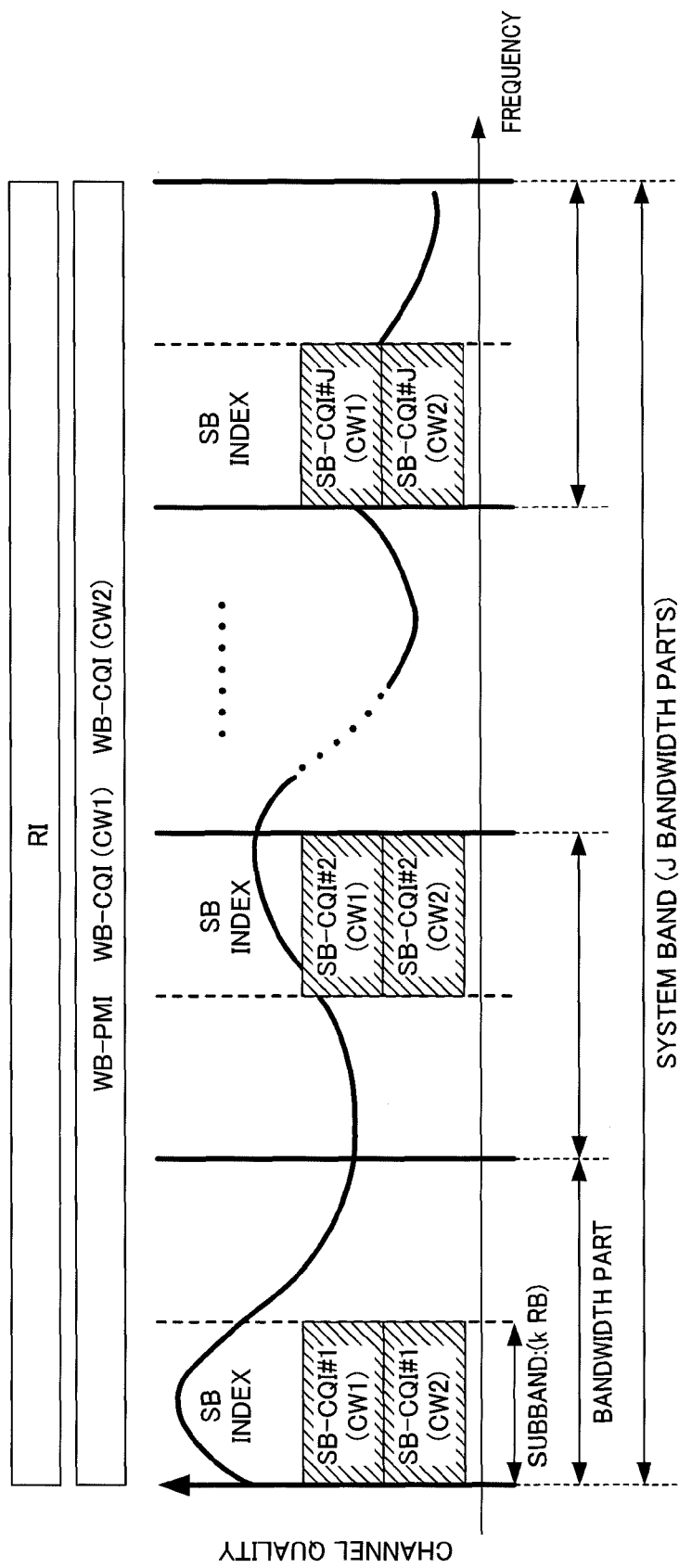
FIG. 3 is a diagram to explain subband CQI feedback using a PUCCH.

FIG. 3 is a diagram for explaining subband CQI feedback using the PUCCH. Note that FIG. 3 shows a case where the system band is formed with J bandwidth parts (BPs) and where each BP is formed with two subbands. Also, in FIG. 3, in order to make it possible to select an adequate MCS (Modulation and Coding Scheme) on a per codeword (CW) basis in the base station apparatus eNodeB, CQIs that correspond to two CWs (CW 1 and CW 2) are fed back.

As shown in FIG. 3, in subband CQI feedback (3GPP TS36.213) using the PUCCH in feedback mode 2-1, the subband to show the highest received SINR in each BP is selected, and the CQI in that subband is fed back to the base station apparatus eNodeB with an SB index. Furthermore, each BP's information is fed back cyclically. Note that the RI, WB-PMI and WB-CQIs (CW 1 and CW 2) are fed back in accordance with the system band.

Figure 4:
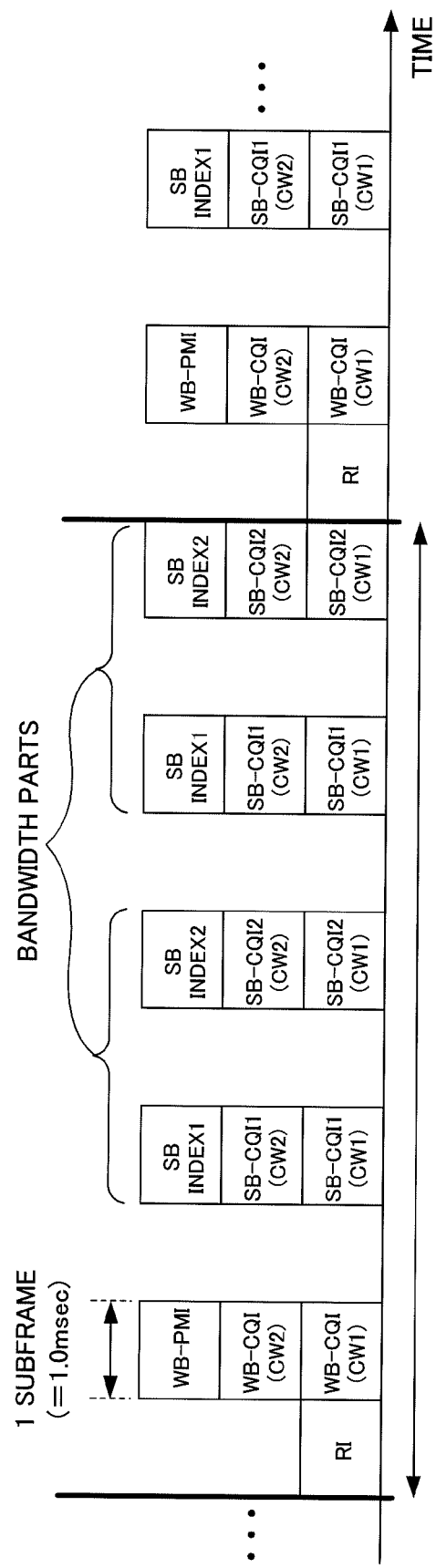
FIG. 4 is a diagram to explain PMI/CQI/RI feedback using a PUCCH.

To show in the example of FIG. 2B, the RI, WB-PMI, WB-CQIs and SB-CQIs (CW 1 and CW 2) shown in FIG. 3 are allocated to each subframe as shown in FIG. 4. Note that, in FIG. 4, for ease of explanation, a subframe where the RI is allocated is referred to as the first subframe. As shown in FIG. 4, the RI is fed back in the first subframe, and the WB-PMI and WB-CQIs (CW 1 and CW 2) are fed back in the second subframe. The SB-CQIs are fed back in the fourth, sixth, eighth and tenth subframes, with SB indices. Here, a case is shown where, in the fourth and eighth subframes, SB-CQIs 1 (CW 1 and CW 2) are fed back with SB index 1, and where, in the sixth and tenth subframes, SB-CQIs 2 (CW 1 and CW 2) are fed back with SB index 2.

Now, as described above, in downlink MIMO transmission using eight transmitting antennas, there is an agreement that two types of PMIs which are selected from two different codebooks (hereinafter referred to as "double codebook") are fed back. Here, the double codebook is formed with the first codebook for a wideband/long cycle, and a second codebook for a subband/short cycle. In downlink MIMO transmission using eight transmitting antennas, a WB-PMI (WB-PMI 1) selected from the first codebook and a SB-PMI (SB-PMI 2) selected from the second codebook are fed back. Note that, although the second codebook is for a subband/short cycle, it is also possible to select a WB-PMI (WB-PMI 2), in addition to SB-PMI 2.

In this feedback mode 2-1 in downlink MIMO transmission using eight transmitting antennas, precoding weights are determined from feedback information in three subframes that is adjusted based on the last RI that was fed back. The feedback information in these three subframes may be referred to as "three-subframe report." This "three-subframe report" is formed with report 1 to report 3, each defining feedback information.

In report 1, an RI and a one-bit PTI (Precoder Type Indicator) are defined. In report 2 and report 3, information according to the value of the PTI in report 1 is defined. In report 2, when the value of the PTI is "0," WB-PMI 1 that is selected from the first codebook is fed back, and, when the value of the PTI is "1," WB-CQIs and WB-PMI 2 that is selected from the second codebook are fed back. In report 3, when the value of the PTI is "0," WB-CQIs and WB-PMI 2 that is selected from the second codebook are fed back, and, when the value of the PTI is "1," SB-CQIs and SB-PMI 2 that is selected from the second codebook are fed back. That is to say, by changing the value of the PTI, it is possible to switch the information to feed back in report 3 between feedback information related to a wideband and feedback information related to a subband.

Figure 5A:
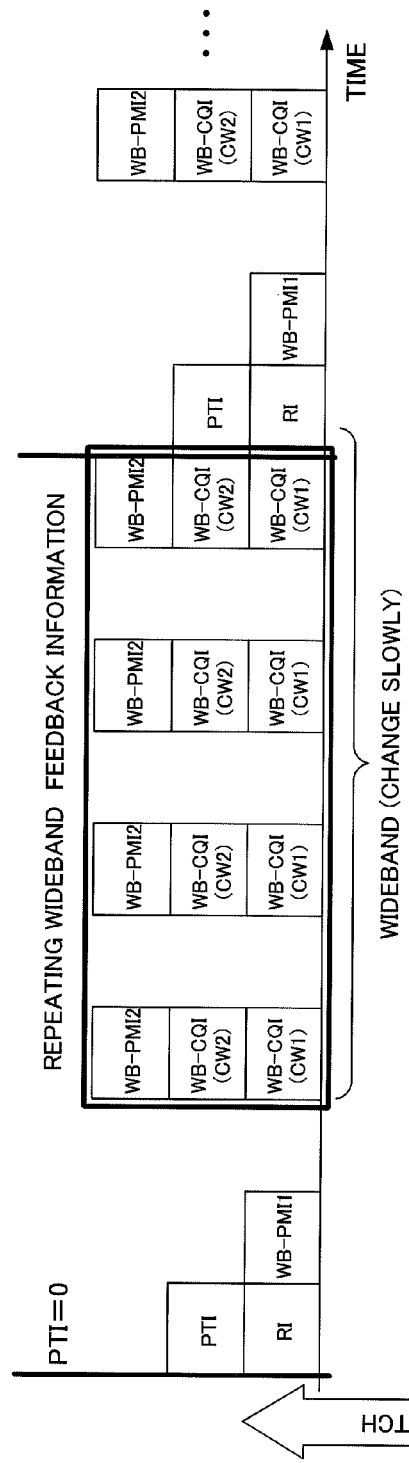
FIG. 5 provides diagrams to explain PMI/CQI/RI feedback using a PUCCH in downlink MIMO transmission using eight transmitting antennas.
Figure 5B:
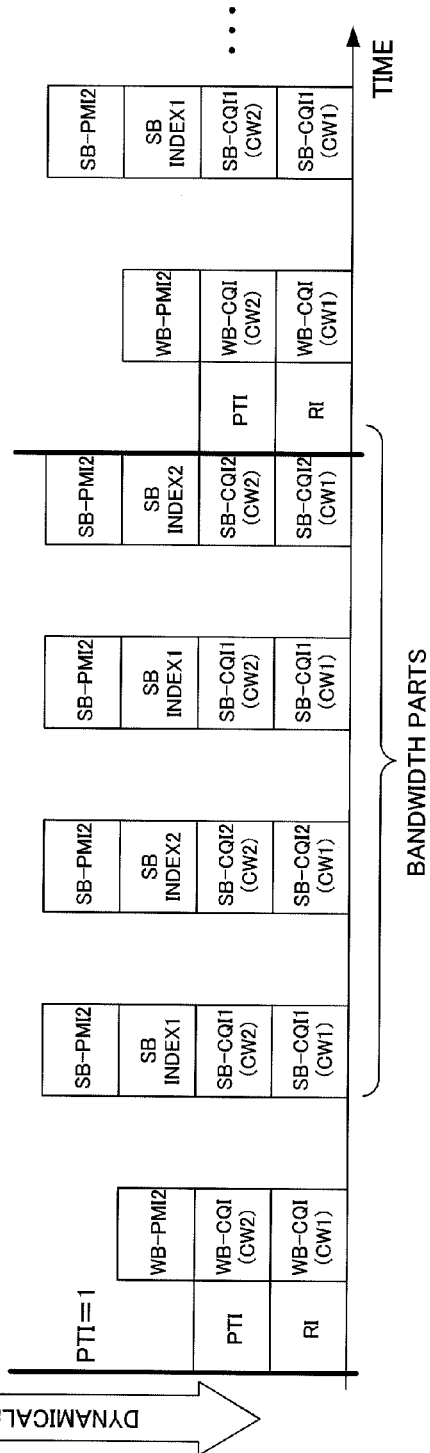

FIG. 5 is a diagram to explain PMI/CQI/RI feedback using the PUCCH in downlink MIMO transmission using eight transmitting antennas. FIG. 5A shows feedback information when PTI=0, and FIG. 5B shows feedback information when PTI=1. Note that FIG. 5 shows a case where the number of subbands (BPs) is two. Also, in FIG. 5, for ease of explanation, a subframe where the RI is allocated is referred to as the first subframe.

When PTI=0, as shown in FIG. 5A, an RI and a PTI (PTI=0) are fed back in the first subframe (report 1). Also, in the second subframe, WB-PMI 1 that is selected from the first codebook is fed back (report 2). Furthermore, in the fourth, sixth, eighth and tenth subframes, WB-CQIs (CW 1 and CW 2) and WB-PMI 2 that is selected from the second codebook are fed back (report 3).

When PTI=1, as shown in FIG. 5B, an RI and PTI (PTI=1) are fed back in the first subframe (report 1). Also, in the second subframe, WB-CQIs (CW 1 and CW 2) and WB-PMI 2 that is selected from the second codebook are fed back (report 2). Furthermore, in the fourth, sixth, eighth and tenth subframes, SB-CQIs and SB indices, and SB-PMI 2 that is selected from the second codebook, are fed back (report 3). Here, a case is shown where, in the fourth and eighth subframes, SB-CQIs 1 (CW 1 and CW 2), SB index 1 and SB-PMI 2 are fed back, and, in the sixth and tenth subframes, SB-CQIs 2 (CW 1 and CW 2), SB index 2 and SB-PMI 2 are fed back.

In feedback mode 2-1 in downlink MIMO transmission using eight transmitting antennas, as shown in FIG. 5, feedback information is transmitted using common subframes when PTI=0 and when PTI=1. Consequently, when PTI=0, as shown in FIG. 5A, in the fourth, sixth, eighth and tenth subframes (report 3), the same feedback information (WB-CQIs (CW 1 and CW 2) and WB-PMI 2) is transmitted in an overlapping manner.

The present inventors have focused on the fact that the same feedback information that is transmitted in an overlapping manner when PTI=0 might make efficient use of radio resources difficult, and arrived at the present invention by finding out that it is possible to feed back PMIs that are required to generate precoding weights, while securing improvement of throughput performance, in downlink MIMO transmission using a plurality of transmitting antennas, by avoiding overlapping transmission of the same feedback information.

That is to say, the first gist of the present invention is that, in a mode to include a PTI in a physical uplink control channel (PUCCH) and feed back the PTI to a base station apparatus eNodeB for downlink MIMO transmission using a plurality of transmitting antennas (for example, eight transmitting antennas), the transmission cycle or offset parameter of feedback information corresponding to report 2 and report 3 when PTI=0 are made different from the transmission cycle or offset parameter of feedback information corresponding to report 2 and report 3 when PTI=1 and the former feedback information and the latter feedback information are multiplexed, and the multiplexed signal is transmitted to the base station apparatus by the physical uplink control channel, so that PMIs required to generate precoding weights are fed back, while securing improvement of throughput performance, in downlink MIMO transmission using a plurality of transmitting antennas.

Also, a second gist of the present invention is that, when a PTI is included in a physical uplink control channel (PUCCH) and fed back to a base station apparatus eNodeB for downlink MIMO transmission using a plurality of transmitting antennas (for example, eight transmitting antennas), feedback information for MU-MIMO is multiplexed on part of feedback information corresponding to report 3 when PTI=0, and the multiplex signal is transmitted to the base station apparatus by the physical uplink control channel, so that PMIs required to generate precoding weights are fed back, while securing improvement of throughput performance, in downlink MIMO transmission using a plurality of transmitting antennas.

Furthermore, a third gist of the present invention is that, when a PTI is included in a physical uplink control channel (PUCCH) and fed back to a base station apparatus eNodeB for downlink MIMO transmission using a plurality of transmitting antennas (for example, eight transmitting antennas), feedback information corresponding to report 2 and report 3 when PTI=0 is multiplexed in a repetitive manner, and the multiplex signal is transmitted to the base station apparatus by the physical uplink control channel, so that PMIs required to generate precoding weights are fed back, while securing improvement of throughput performance, in downlink MIMO transmission using a plurality of transmitting antennas.

Furthermore, a fourth gist of the present invention is that, when a PTI is included in a physical uplink control channel (PUCCH) and fed back to a base station apparatus eNodeB for downlink MIMO transmission using a plurality of transmitting antennas (for example, eight transmitting antennas), feedback information corresponding to report 3 when PTI=0 only on part of subframes, and the multiplex signal is transmitted to the base station apparatus by the physical uplink control channel, so that PMIs required to generate precoding weights are fed back, while securing improvement of throughput performance, in downlink MIMO transmission using a plurality of transmitting antennas.

Figure 6:
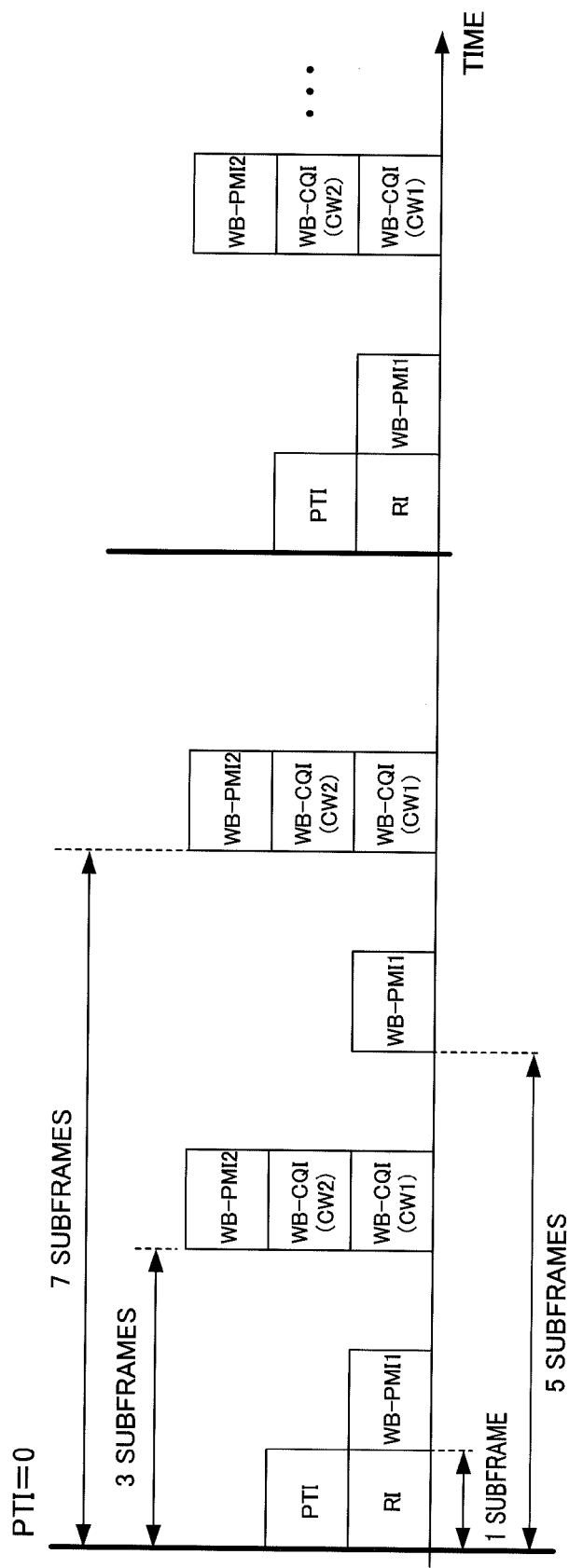
FIG. 6 is a diagram to explain a feedback method using a PUCCH according to the first example of the present invention.

FIG. 6 is a diagram to explain a feedback method using a PUCCH according to the first example of the present invention. With the feedback method according to the first example, as illustrated in FIG. 6, the offset parameter of feedback information corresponding to report 2 and report 3 when PTI=0 are made different from the offset parameter of feedback information corresponding to report 2 and report 3 when PTI=1 and they are multiplexed.

FIG. 6 shows a case where a subframe to feed back WB-PMI 1 (report 2) is one subframe or five subframes offset from a subframe to feed back the RI and PTI (report 1), and where a subframe to feed back WB-PMI 2 and WB-CQIs (CW 1 and CW 2) (report 3) is three subframes or seven subframes offset from a subframe to feed back the RI and PTI (report 1).

With the feedback method according to the first example, it is possible to increase the frequency of feeding back WB-PMI 1 (report 2) when PTI=0, so that it is possible to generate precoding weights that adequately reflect the channel quality in the system band in the base station apparatus eNodeB, even in an environment where, for example, the channel quality in the system band changes fast, and, consequently, it is possible to secure improvement of throughput performance.

Note that, with the feedback method according to the first example, when the offset parameter of feedback information corresponding to report 2 and report 3 is set to an arbitrary value, cases might occur where multiplexing on subframes is difficult due to the relationship with feedback information using the PUCCH from other mobile terminal apparatuses UE. That is to say, in feedback using the PUCCH, the RI is multiplexed in PUCCH format 1, while PMIs/CQIs are multiplexed in PUCCH format 2. It is not possible to multiplex these RIs, and PMIs/CQIs on the same subframe.

Consequently, with the feedback method according to the first example, it is necessary to adjust the offset parameters such that feedback information corresponding to report 2 and report 3 is allocated to subframes where such limitations as to multiplexing on PUCCH formats do not apply. For example, it is preferable to adjust the offset parameters such that multiplexing is executed on the same subframe as the subframe on which report 2 or report 3 is multiplexed when PTI=1. By setting the offset parameters in this way, it is possible to increase the frequency of feeding back WB-PMI 1 (report 2), without being subject to limitations related to multiplexing on PUCCH formats.

Note that a case is described here where the offset parameter of feedback information corresponding to report 2 and report 3 when PTI=0 and the offset parameter of feedback information corresponding to report 2 and report 3 when PTI=1 are made different. However, it is equally possible to make the transmission cycle of feedback information corresponding to report 2 and report 3 when PTI=1 and the transmission cycle of feedback information corresponding to report 2 and report 3 when PTI=1 different. In this case, too, it is possible to achieve the same advantage as when the offset parameters are made different.

Figure 7:
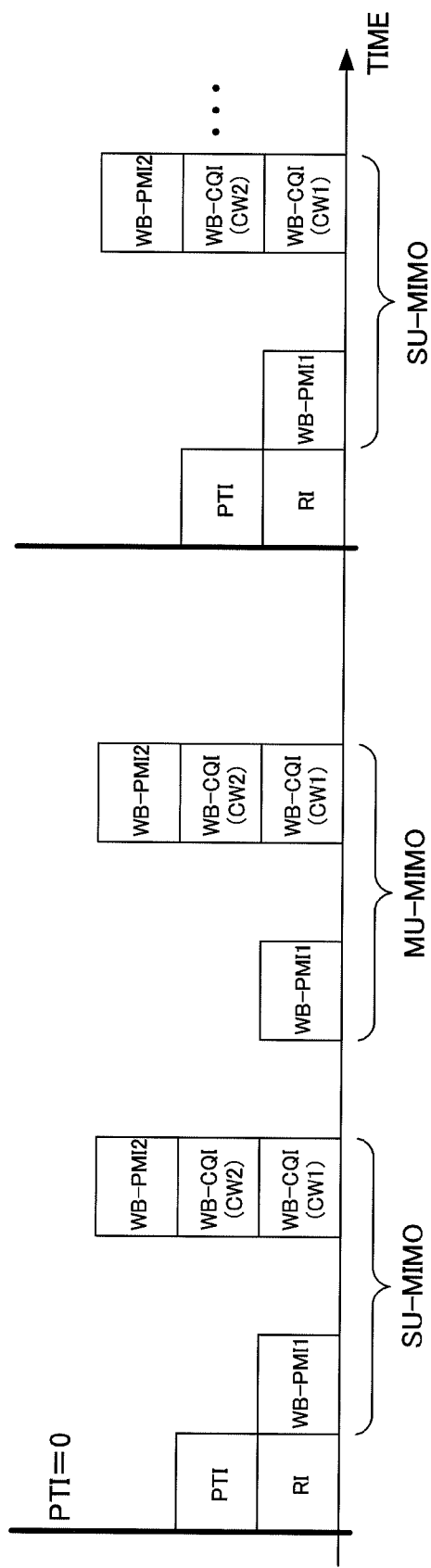
FIG. 7 is a diagram to explain a feedback method using a PUCCH according to a second example of the present invention.
Figure 8:
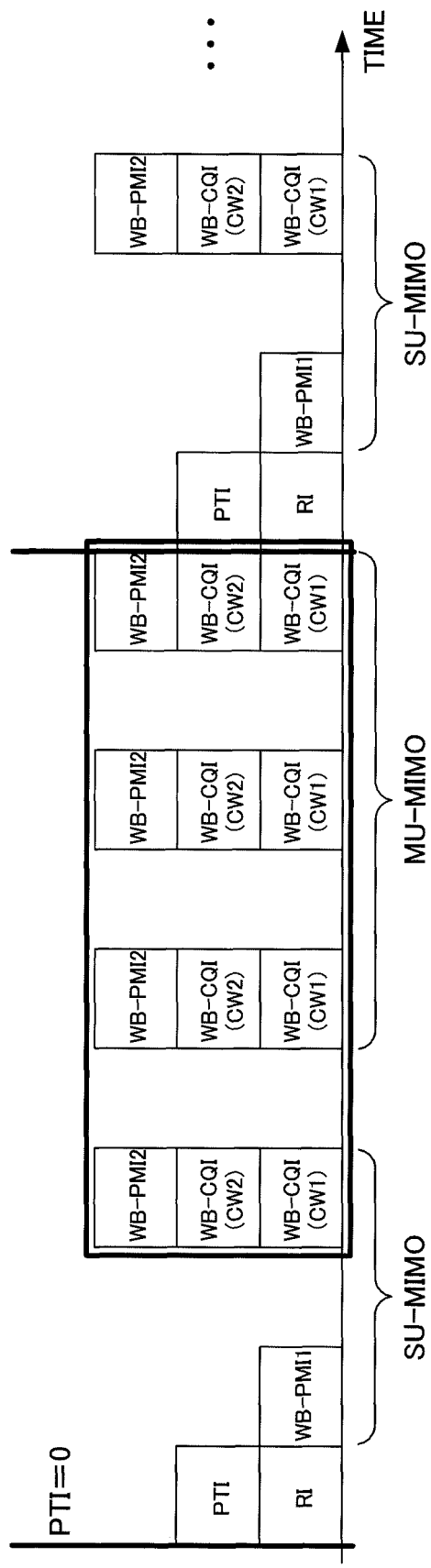
FIG. 8 is a diagram to explain a feedback method using a PUCCH according to the second example of the present invention.

FIG. 7 and FIG. 8 are diagrams for explaining a feedback method using a PUCCH according to a second example of the present invention. With the feedback method according to the second example, as illustrated in FIG. 7 and FIG. 8, feedback information for MU-MIMO is multiplexed on part of feedback information corresponding to report 3 when PTI=0.

FIG. 7 shows a case where WB-PMI 1 for SU-MIMO is multiplexed on the second subframe and also WB-PMI 2 for SU-MIMO and WB-CQIs (CW 1 and CW 2) are multiplexed on the fourth subframe, and WB-PMI 1 for MU-MIMO is multiplexed on the sixth subframe and also WB-PMI 2 for MU-MIMO and WB-CQIs (CW 1 and CW 2) are multiplexed on the eighth subframe. Note that, as for the technique of multiplexing WB-PMI 1 (report 2) on the sixth subframe, the same technique as the feedback method according to the first example may be possible.

On the other hand, in FIG. 8, WB-PMI 1 for SU-MIMO is multiplexed on the second subframe and also WB-PMI 2 for SU-MIMO and WB-CQIs (CW 1 and CW 2) are multiplexed on the fourth subframe, and WB-PMI 2 for MU-MIMO and WB-CQIs (CW 1 and CW 2) are multiplexed on the sixth, eighth and tenth subframes.

Note that, in FIG. 8, feedback information (WB-PMI 2 and WB-CQIs (CW 1 and CW 2)) to transmit as report 3 is common with the feedback information shown in FIG. 5A, so that it is not necessary to change the offset parameter and so on as in the feedback method according to the first example.

Note that, since WB-PMI 1 for MU-MIMO is not fed back, it is necessary to use WB-PMI 1 for SU-MIMO in the base station apparatus eNodeB.

With the feedback method according to the second example, feedback information for MU-MIMO is multiplexed on part of feedback information corresponding to report 3, so that it is possible to feed back PMIs that are required when MU-MIMO transmission is performed, to the base station apparatus eNodeB, and, consequently, it is possible to adequately switch between SU-MIMO transmission and MU-MIMO transmission in the base station apparatus eNodeB, and secure improvement of throughput performance.

Note that, with the feedback method according to the second example, the base station apparatus eNodeB preferably sees WB-PMIs and WB-CQIs for MU-MIMO that are fed back, as WB-PMIs and WB-CQIs for MU-MIMO corresponding to different ranks from the rank indicated by the last (the most recent) RI that was fed back. For example, it is possible to see WB-PMIs and WB-CQIs for MU-MIMO that are fed back as WB-PMIs and WB-CQIs for MU-MIMO corresponding to a rank that is defined in advance, with respect to the last RI that was fed back. To be more specific, when the last rank that was fed back is "2," WB-PMIs and WB-CQIs for MU-MIMO that are fed back may be seen as WB-PMIs and WB-CQIs for MU-MIMO corresponding to rank 1, and, when the last rank that was fed back is "3," WB-PMIs and WB-CQIs for MU-MIMO that are fed back may be seen as WB-PMIs and WB-CQIs for MU-MIMO corresponding to rank 2. In this way, by seeing WB-PMIs and WB-CQIs for MU-MIMO that are fed back as WB-PMIs and WB-CQIs for MU-MIMO corresponding to a different rank from the rank indicated by the last RI that was fed back, it is possible to generate precoding weights to match channel quality in base station apparatus eNodeB.

Also, with the feedback method according to the second example, as for WB-PMIs for MU-MIMO, it is preferable to feed back PMIs that improve throughput performance in relationship to other mobile terminal apparatuses UE (Best companion PMIs), or feed back PMIs limited to specific ranks (for example, ranks 1 and 2) (Rank restricted PMIs). Also, as for WB-CQIs for MU-MIMO, it is preferable to feed back CQIs taking into account the interference between a plurality of mobile terminal apparatuses UE. By feeding back WB-PMIs and WB-CQIs for MU-MIMO such as these, it is possible to further improve throughput performance when MU-MIMO transmission is performed.

Figure 9:
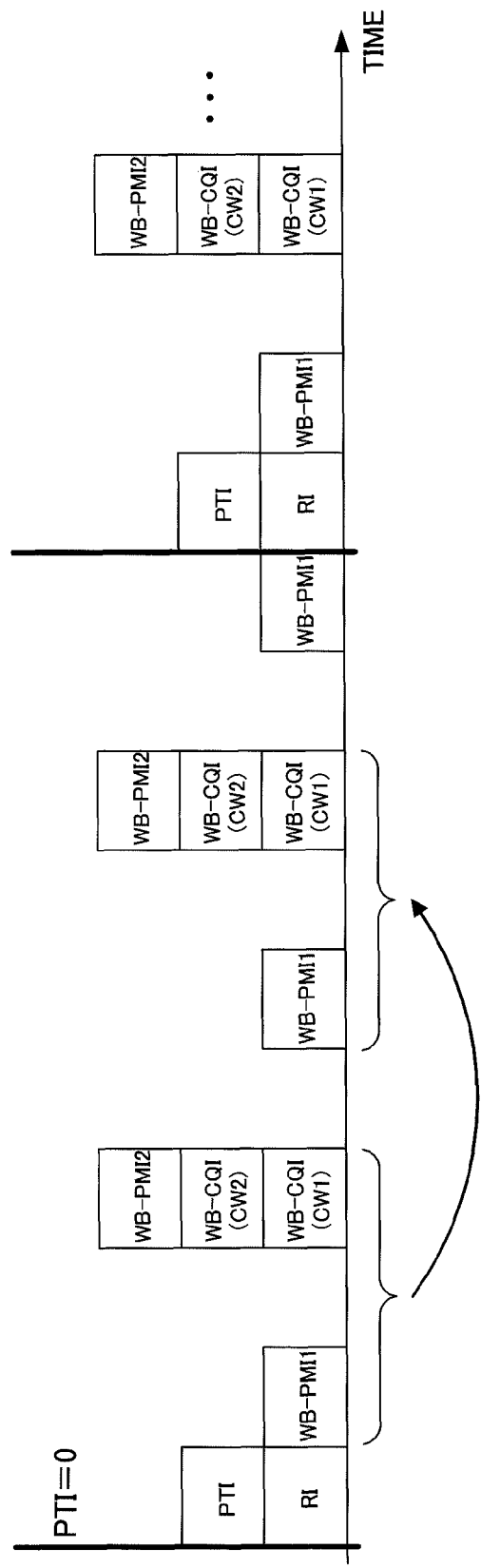
FIG. 9 is a diagram to explain a feedback method using a PUCCH according to a third example of the present invention.

FIG. 9 is a diagram for explaining a feedback method using a PUCCH according to a third example of the present invention. With the feedback method according to the third example, as illustrated in FIG. 9, feedback information corresponding to report 2 and report 3 when PTI=0 is multiplexed in a repetitive manner.

FIG. 9 shows a case where WB-PMI 1 (report 2) is multiplexed on the second subframe and also WB-PMI 2 and WB-CQIs (CW 1 and CW 2) (report 3) are multiplexed on the fourth subframe, and where, furthermore, in the sixth and eighth subframes, too, the same feedback information (WB-PMI 1, WB-PMI 2 and WB-CQIs (CW 1 and CW 2)) as in the second and fourth subframes is multiplexed.

With the feedback method according to the third example, feedback information corresponding to report 2, report 3 is fed back in a repetitive manner, so that it is possible to improve the received quality of feedback information corresponding to report 2 and report 3 in the base station apparatus eNodeB, so that it is possible to generate adequate precoding weights in the base station apparatus eNodeB and secure improvement of throughput performance.

Figure 10:
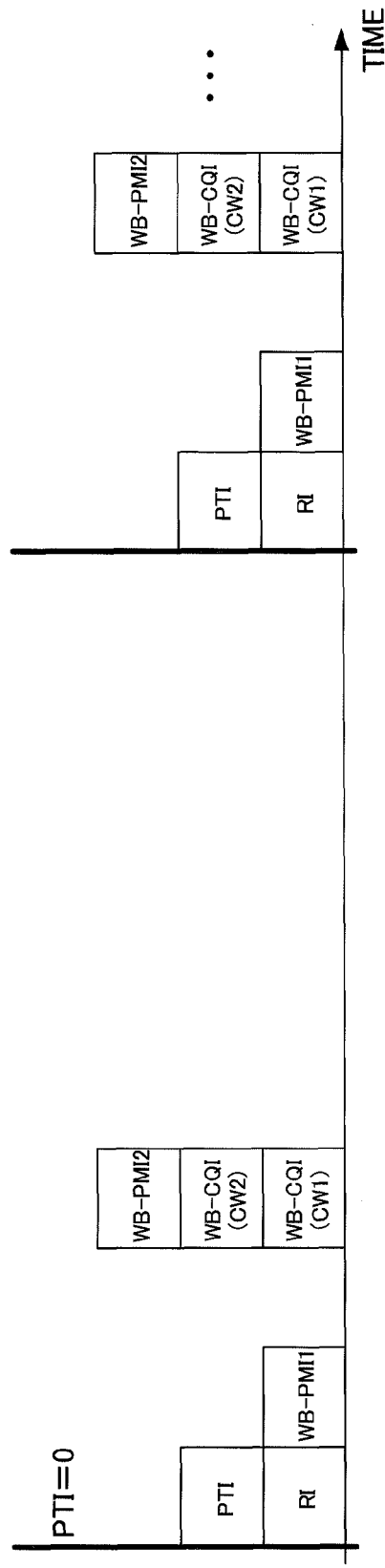
FIG. 10 is a diagram to explain a feedback method using a PUCCH according to a fourth example of the present invention.

FIG. 10 is a diagram for explaining a feedback method using a PUCCH according to a fourth example of the present invention. With the feedback method according to the fourth example, as illustrated in FIG. 10, feedback information corresponding to report 3 when PTI=0 is multiplexed on part of the subframes.

FIG. 10 shows a case where WB-PMI 1 (report 2) is multiplexed on the second subframe, and also WB-PMI 2 and WB-CQIs (CW 1 and CW 2) (report 3) are multiplexed on the fourth subframe alone. WB-PMI 2 and WB-CQIs (CW 1 and CW 2) (report 3) are not multiplexed on the fifth subframe or later subframes.

With the feedback method according to the fourth example, feedback information corresponding to report 3 is multiplexed only on part of the subframes, so that it is possible to use other subframes on which the feedback information corresponding to report 3 is not multiplexed, for transmission of feedback information in other mobile terminal apparatuses UE, and, consequently, it is possible to secure improvement of overall system throughput performance by improving throughput performance in other mobile terminal apparatuses UE. Also, since the feedback information corresponding to report 3 is multiplexed only on part of the subframes, it is possible to reduce the power consumption incurred by transmission of feedback information in the mobile terminal apparatus UE.

Now, embodiments of the present invention will be described below in detail with reference to the accompanying drawings. Cases will be described here where a base station apparatus and mobile terminal apparatuses to support the LTE-A system are used.

Figure 11:
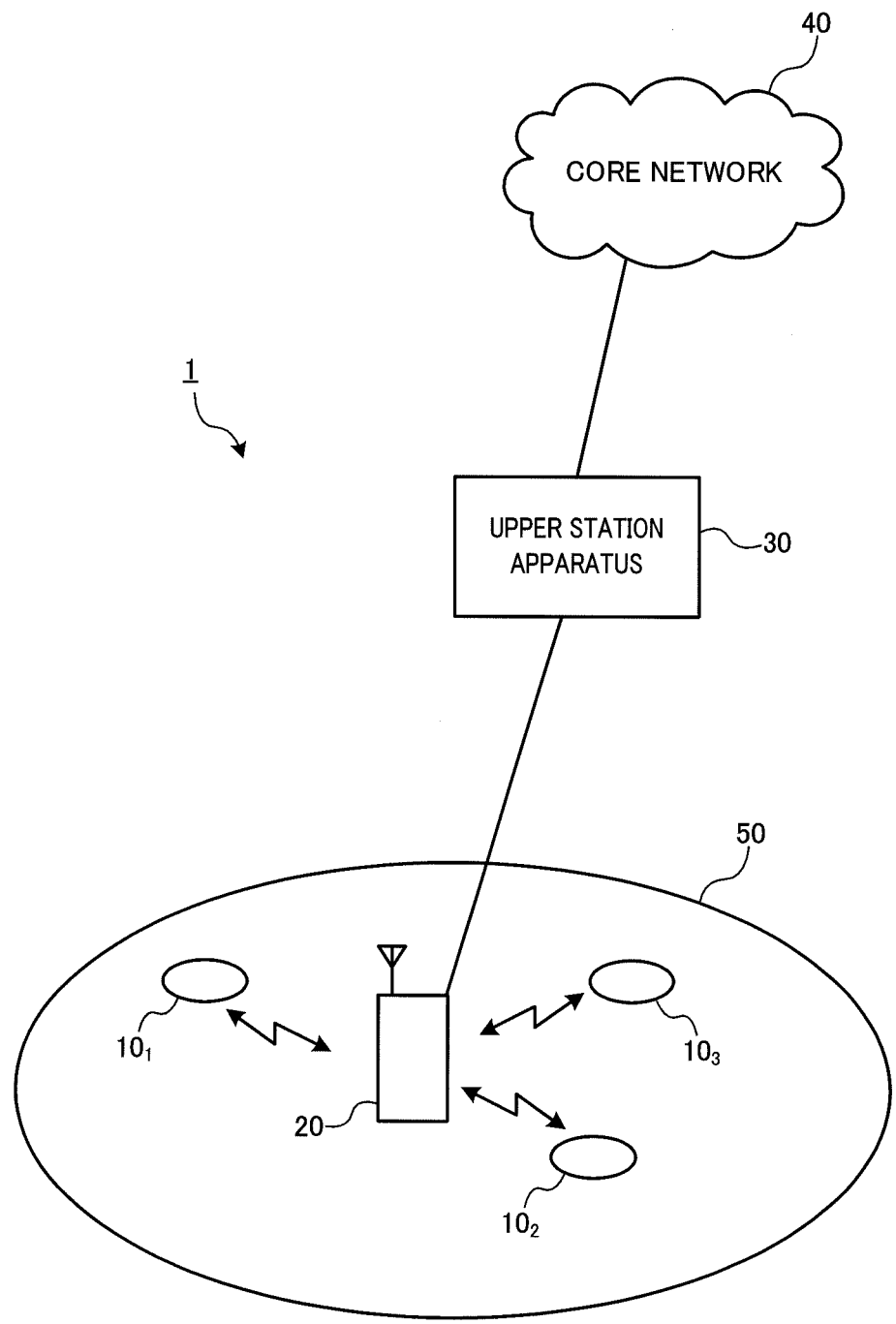
FIG. 11 is a diagram for explaining a configuration of a mobile communication system according to an embodiment of the present invention.

Referring to FIG. 11, a mobile communication system 1 having a mobile terminal apparatus (UE) 10 and a base station apparatus (eNodeB) 20 according to an embodiment of the present invention will be described. FIG. 11 is a diagram for explaining the configuration of the mobile communication system 1 having a mobile terminal apparatus 10 and a radio base station apparatus 20 according to an embodiment of the present invention. Note that the mobile communication system 1 shown in FIG. 11 is a system to accommodate, for example, the LTE system or SUPER 3G. This mobile communication system 1 may also be referred to as IMT-Advanced or may be referred to as 4G.

As shown in FIG. 11, a radio communication system 1 is configured to include a base station apparatus 20, and a plurality of mobile terminal apparatuses 10 ($10_1$, $10_2$, $10_3$, . . . $10_n$, where n is an integer to satisfy n>0) that communicate with the base station apparatus 20. The base station apparatus 20 is connected with an upper station apparatus 30, and this upper station apparatus 30 is connected with a core network 40. The mobile terminal apparatuses 10 communicate with the base station apparatus 20 in a cell 50. Note that the upper station apparatus 30 includes, for example, an access gateway apparatus, a radio network controller (RNC), a mobility management entity (MME) and so on, but is by no means limited to these.

The mobile terminal apparatuses ($10_1$, $10_2$, $10_3$, . . . $10_n$) have the same configuration, functions and state, so that, the following descriptions will be given with respect to "mobile terminal apparatus 10," unless specified otherwise. Also, although the mobile terminal apparatus 10 performs radio communication with the base station apparatus 20 for ease of explanation, more generally, user apparatuses (UE: User Equipment) including mobile terminal apparatuses and fixed terminal apparatuses may be used.

In the mobile communication system 1, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to reduce interference between terminals by dividing, per terminal, the system band into bands formed with one or continuous resource blocks, and allowing a plurality of terminals to use mutually different bands.

Now, communication channels in the LTE system will be described. On the downlink, a PDSCH, which is used by each mobile terminal apparatus 10 on a shared basis, and downlink L1/L2 control channels (PDCCH (Physical Downlink Control CHannel), PCFICH (Physical Control Field Indicator CHannel), and PHICH (Physical Hybrid automatic repeat request Indicator CHannel)) are used. By means of this PDSCH, user data, that is, normal data signals, is transmitted. Transmission data is included in this user data. Note that the CCs and scheduling information that are allocated to the mobile terminal apparatus 10 by the base station apparatus 20 are reported to the mobile terminal apparatus 10 by the L1/L2 control channels.

On the uplink, a PUSCH (Physical Uplink Shared Channel) that is used by each mobile terminal apparatus 10 on a shared basis and a PUCCH (Physical Uplink Control Channel), which is an uplink control channel, are used. User data is transmitted by means of this PUSCH. Also, downlink radio quality information (CQI) and so on are transmitted by means of the PUCCH.

(Embodiment 1)

Figure 12:
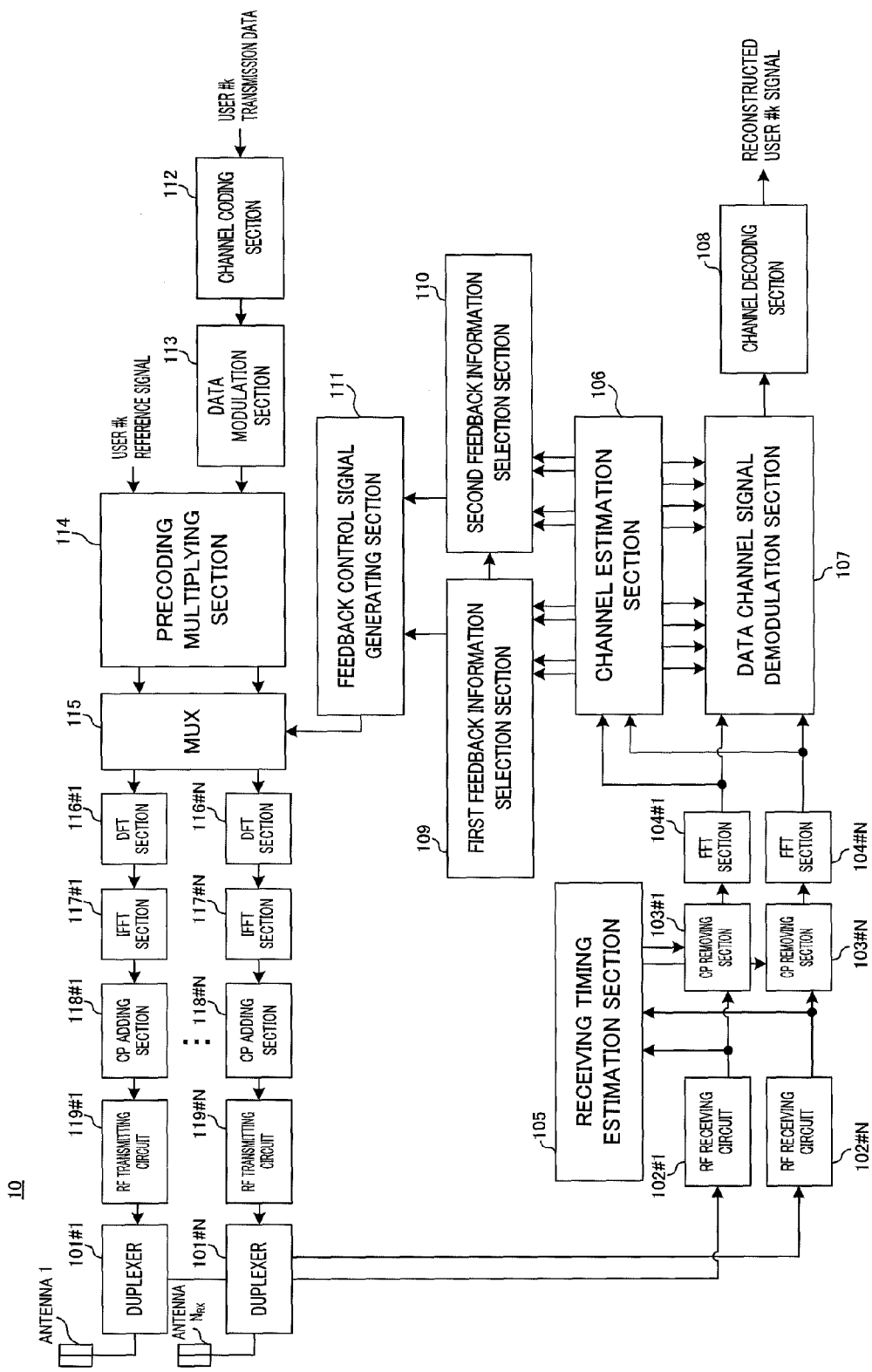
FIG. 12 is a block diagram showing a configuration of a mobile terminal apparatus according to embodiment 1 of the present invention.
Figure 13:
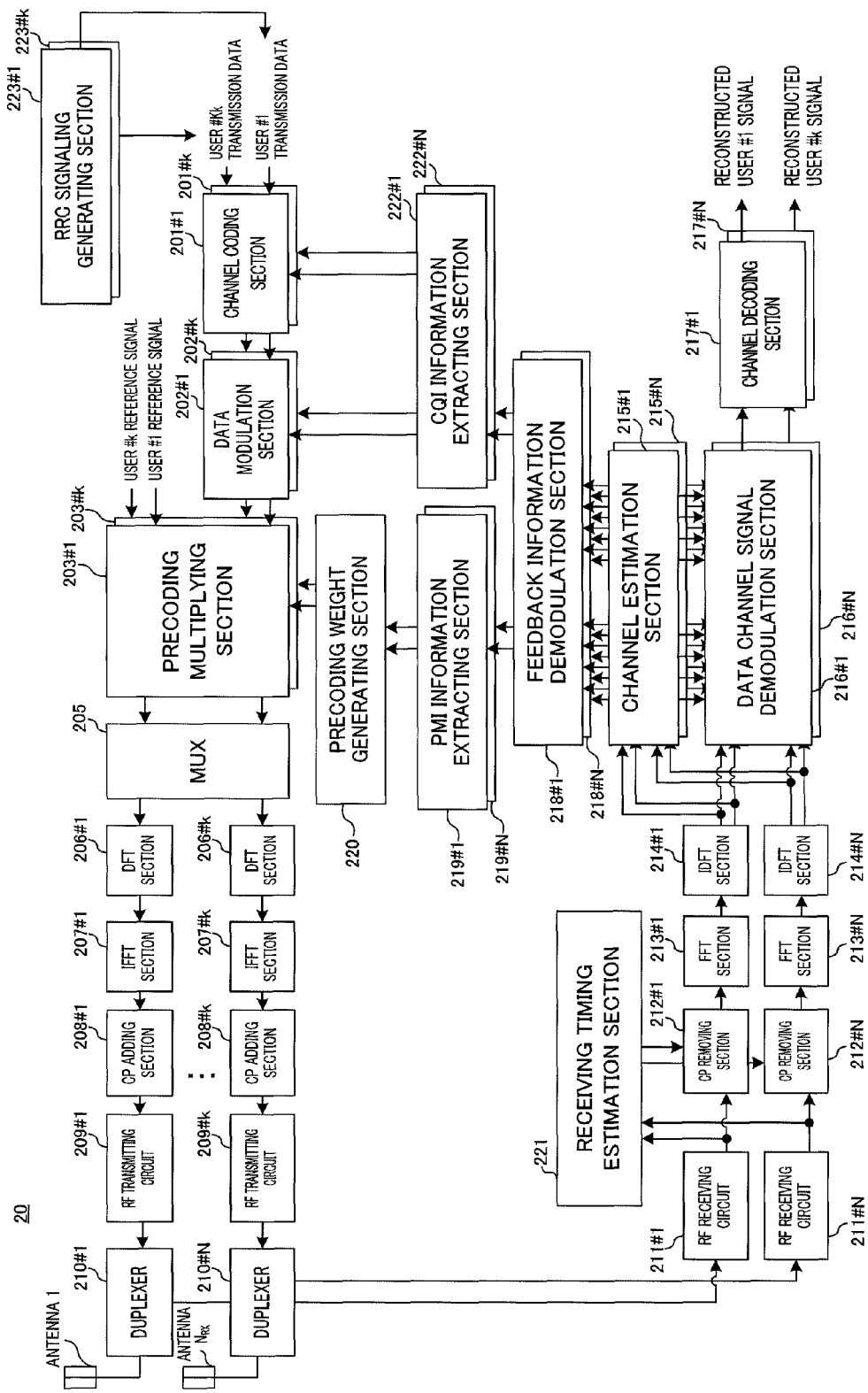
FIG. 13 is a block diagram showing a configuration of a radio base station apparatus according to embodiment 1.

FIG. 12 is a block diagram showing a configuration of a mobile terminal apparatus 10 according to embodiment 1 of the present invention. FIG. 13 is a block diagram showing a configuration of a base station apparatus 20 according to embodiment 1. Note that the configurations of the base station apparatus 20 and the mobile terminal apparatus 10 illustrated in FIG. 12 and FIG. 13 are given by simplifying the present invention for ease of explanation, and both have configurations which a general mobile terminal apparatus and base station apparatus have.

In the mobile terminal apparatus 10 shown in FIG. 12, transmission signals transmitted from the base station apparatus 20 are received by antennas 1 to $N_{RX}$, electrically separated into the transmission route and the reception route by duplexers 101 #1 to 101 #N, and then output to RF receiving circuits 102 #1 to 102 #N. Then, in RF receiving circuits 102 #1 to 102 #N, a frequency conversion process to convert the radio frequency signals into baseband signals is performed, and the results are output to a receiving timing estimation section 105 and CP removing sections 103 #1 to 103 #N. The receiving timing estimation section 105 estimates the receiving timing from the received signals after the frequency conversion process, and outputs the receiving timing to CP removing sections 103 #1 to 103 #N. CP removing sections 103 #1 to 103 #N remove the CPs (Cyclic Prefixes), and fast Fourier transform sections (FFT sections) 104 #1 to 104 #N perform a Fourier transform to convert the time sequence signal into frequency domain signals. The received signals having been converted into frequency domain signals are output to a channel estimation section 106 and a data channel signal demodulation section 107.

The channel estimation section 106 estimates the channel state from the reference signal included in the received signals output from FFT sections 104 #1 to #N, and reports the estimated channel state to a data channel signal demodulation section 107, a first feedback information selection section 109 and a second feedback information selection section 110. The data channel signal demodulation section 107 demodulates the data channel signal based on the reported channel state. The demodulated data channel signal is subjected to channel decoding in a channel decoding section 108 and reconstructed back to a user #k signal.

The first feedback information selection section 109 selects PMIs based on the channel state reported from the channel estimation section 106. Here, the first feedback information selection section 109 selects PMIs from two codebooks—that is, the first codebook for a wideband/long cycle and a second codebook for a subband/short cycle. The first feedback information selection section 109 selects WB-PMI 1 from the first codebook, and also selects WB-PMI 2 from the second codebook. In this case, the first feedback information selection section 109 is able to select WB-PMI 1 and WB-PMI 2 for SU-MIMO transmission and for MU-MIMO transmission.

Also, the first feedback information selection section 109 selects an RI based on the channel state reported from the channel estimation section 106. Furthermore, the first feedback information selection section 109 measures wideband channel quality based on the channel state reported from the channel estimation section 106, and selects CQIs (WB-CQIs) corresponding to WB-PMI 1 and WB-PMI 2. In this case, the first feedback information selection section 109 is able to select WB-CQIs for SU-MIMO transmission and for MU-MIMO transmission. Furthermore, the first feedback information selection section 109 selects a PTI based on the selected RI and WB-PMI 1. To be more specific, the first feedback information selection section 109 selects a PTI in accordance with the state of change from the previously selected RI and WB-PMI 1 (for example, when there is change, the first feedback information selection section 109 selects "0" for the value of the PTI). The first feedback information selection section 109 reports the selected RI, WB-PMI 1, WB-PMI 2, PTI and WB-CQIs, to a feedback control signal generating section 111. Also, the RI, WB-PMI 1 and PTI that are selected in the first feedback information selection section 109 are reported to a second feedback information selection section 110.

The second feedback information selection section 110 selects PMIs based on the channel state reported from the channel estimation section 106. The second feedback information selection section 110 selects SB-PMI 2 from the second codebook. The second feedback information selection section 110 selects, per subband, SB-PMI 2 that maximizes the received SINR, based on the RI and WB-PMI 1 reported from the first feedback information selection section 109. In this case, the second feedback information selection section 110 is able to select SB-PMIs 2 for SU-MIMO transmission and for MU-MIMO transmission.

Also, the second feedback information selection section 110 measures subband channel quality based on the channel state reported from the channel estimation section 106, and selects CQIs (SB-CQIs) corresponding to SB-PMI 2. In this case, the second feedback information selection section 110 is able to select SB-CQIs for SU-MIMO transmission and for MU-MIMO transmission. The second feedback information selection section 110 reports the selected SB-PMI 2 and SB-CQIs to the feedback control signal generating section 111.

Based on the reported RI, PMIs (WB-PMI 1, WB-PMI 2 and SB-PMI 2) and CQIs (WB-CQIs and SB-CQIs), the feedback control signal generating section 111 generates a control signal (for example, a PUCCH signal) to feed back to the base station apparatus 20. In this case, the feedback control signal generating section 111 generates a control signal in accordance with the formats of report 1 to report 3, depending on the value of the PTI reported from the first feedback information selection section 109. Also, the feedback control signal generating section 111 performs channel coding/data modulation of information about WB-PMI 1, WB-PMI 2, SB-PMI 2, WB-CQIs, SB-CQIs and RI, to feed back in the PUCCH. The control signal generated in the feedback control signal generating section 111 and the PMIs, CQIs and RI after the channel coding are output to the multiplexer (MUX: multiplexing section) 115.

Meanwhile, transmission data #k related to user #k that is output from an upper layer is subjected to channel coding in a channel coding section 112, and, after that, subjected to data modulation in a data modulation section 113. Transmission data #k having been subjected to data modulation in the data modulation section 113 is then subjected to an inverse Fourier transform in a discrete Fourier transform section, which is not illustrated, converted from a time sequence signal to a frequency domain signal, and output to a subcarrier mapping section, which is not illustrated.

The subcarrier mapping section maps transmission data #k to subcarriers in accordance with schedule information that is designated from the base station apparatus 20. Here, the subcarrier mapping section maps (multiplexes) reference signal #k that is generated by a reference signal generating section, which is not illustrated, to subcarriers, with transmission data #k. Transmission data #k mapped to subcarriers in this way is output to a precoding multiplying section 114.

The precoding multiplying section 114 shifts the phase and/or amplitude of transmission data #k, for each of the receiving antennas 1 to $N_{Rx}$, based on the precoding weights corresponding to the PMIs. Transmission data #k having been subjected to the phase and/or amplitude shift in the precoding multiplying section 114 is output to the multiplexer (MUX) 115.

The multiplexer (MUX) 115 combines transmission data #k having been subjected to the phase and/or amplitude shift and the control signal having been generated in the feedback control signal generating section 111, and generates a transmission signal for each of the receiving antennas 1 to $N_{RX}$. The mapping (multiplexing) in this multiplexer (MUX) 115 is performed in accordance with the above-described first to fourth examples. That is to say, feedback information corresponding to report 1 to report 3 is multiplexed on different subframes depending on the values of the PTIs. Note that this multiplexer (MUX) 115 constitutes a multiplexing means.

For example, with the first example, the transmission cycle or offset parameter of feedback information corresponding to report 2 and report 3 when PTI=0 are made different from the transmission cycle or offset parameter of feedback information corresponding to report 2 and report 3 when PTI=1 and the former feedback information and the latter feedback information are multiplexed. Note that the transmission cycle or offset parameter corresponding to report 2 and report 3 when PTI=0 is in accordance with the content of RRC signaling reported from the base station apparatus 20. With the second example, feedback information for MU-MIMO is multiplexed on part of feedback information corresponding to report 3 when PTI=0. With the third example, feedback information corresponding to report 2 and report 3 when PTI=0 is multiplexed in a repetitive manner. With the fourth example, feedback information corresponding to report 3 when PTI=0 is multiplexed only on part of the subframes.

The transmission signals generated in the multiplexer (MUX) 115 are subjected to a discrete Fourier transform in discrete Fourier transform sections (DFT sections) 116 #1 to 116 #N and converted from time sequence signals to frequency domain signals. After that, an inverse fast Fourier transform is performed in inverse fast Fourier transform sections (IFFT sections) 117 #1 to 117 #N, and, after the frequency domain signals are converted to time domain signals, CPs are added in CP adding sections 118 #1 to 118 #N, and the results are output to RF transmitting circuit 119 #1 to 119 #N.

In RF transmitting circuits 119 #1 to 119 #N, a frequency conversion process for conversion into a radio frequency band is performed, and, after that, the results are output to the antenna 1 to the antenna $N_{RX}$, via duplexers 101 #1 to 101 #N, and output to the radio base station apparatus 20 from the antenna 1 to the antenna $N_{RX}$ on the uplink. Note that these RF transmitting circuits 119 #1 to 119 #N, duplexers 101 #1 to 101 #N and the antenna 1 to the antenna $N_{RX}$ constitute a transmitting means to transmit control signals.

Meanwhile, in the base station apparatus 20 shown in FIG. 13, transmission data #1 to #k corresponding to users #1 to #k are output to channel coding sections 201 #1 to 201 #k. RRC signaling generating sections 223 #1 to 223 #k corresponding to users #1 to #k generate RRC signaling including information such as the MIMO transmission method (transmission mode), the CSI (Channel State Information) feedback mode in the PUCCH/PUSCH, and the feedback cycle and offset parameter in that feedback mode. Transmission data #1 to #k include RRC signaling generated in RRC signaling generating sections 223 #1 to 223 #k.

Transmission data #1 to #k are subjected to channel coding in channel coding sections 201 #1 to 201 #k, and, after that, output to data modulation sections 202 #1 to 202 #k and subjected to data modulation. Transmission data #1 to #k subjected to data modulation in data modulation sections 202 #1 to 202 #k are subjected to an inverse discrete Fourier transform in a discrete Fourier transform section, which is not illustrated, converted from time sequence signals to frequency domain signals and then output to precoding multiplying sections 203 #1 to 203 #k.

Precoding multiplying sections 203 #1 to 203 #k apply a phase and/or amplitude shift to transmission data #1 to #k, for each of the antennas 1 to $N_{TX}$, based on precoding weights provided from a precoding weight generating section 220, which will be described later (weighting of the antennas 1 to $N_{TX}$ by precoding). Transmission data #1 to #k having been subjected to the phase and/or amplitude shift by precoding multiplying sections 203 #1 to 203 #k are output to a multiplexer (MUX) 205.

The multiplexer (MUX) 205 generates a transmission signal for each of the transmitting antennas 1 to $N_{TX}$, with respect to transmission data #1 to #k having been subjected to the phase and/or amplitude shift. The transmission signals generated by the multiplexer (MUX) 205 are subjected to a discrete Fourier transform in discrete Fourier transform sections (DFT sections) 206 #1 to 206 #k, and converted from time sequence signals to frequency domain signals. After that, an inverse fast Fourier transform is performed in inverse fast Fourier transform sections (IFFT sections) 207 #1 to 207 #k, and, after frequency domain signals are converted to time domain signals, CPs are added in CP adding sections 208 #1 to 208 #k, and the results are output to RF transmitting circuits 209 #1 to 209 #k.

After a frequency conversion process for conversion into a radio frequency band is performed in RF transmitting circuit 209 #1 to 209 #N, the results are output to the antenna 1 to the antenna $N_{TX}$ via duplexers 210 #1 to 210 #N, and output from the antenna 1 to the antenna $N_{TX}$, to the mobile terminal apparatus 10, on the downlink.

Transmission signals that are output from the mobile terminal apparatus 10 on the uplink are received by the antennas 1 to $N_{TX}$, electrically separated into the transmission route and the reception route in duplexers 210 #1 to 210 #N, and, after that, output to RF receiving circuits 211 #1 to 211 #N. Then, after a frequency conversion process for conversion from radio frequency signals to baseband signals is performed in RF receiving circuits 211 #1 to 211 #N, the results are output to a receiving timing estimation section 221 and CP removing sections 212 #1 to 212 #N. In the receiving timing estimation section 221, the receiving timing is estimated from the received signals after having been subjected to the frequency conversion process, and the receiving timing is output to CP removing sections 212 #1 to 212 #N.

The CPs are removed in CP removing sections 212 #1 to 212 #N, and, in fast Fourier transform sections (FFT sections) 213 #1 to 213 #N, a Fourier transform is performed, and the time sequence signals are converted to frequency domain signals. After that, an inverse discrete Fourier transform is performed in inverse discrete Fourier transform sections (IDFT sections) 214 #1 to 214 #N, and the frequency domain signals are converted to time domain signals. The received signals having been converted into time domain signals are output to channel estimation sections 215 #1 to 215 #N and data channel signal demodulation sections 216 #1 to 216 #N.

Channel estimation sections 215 #1 to 215 #N estimate the channel state from the reference signal included in the received signals output from IDFT sections 214 #1 to 214 #N, and report the estimated channel state to data channel signal demodulation sections 216 #1 to 216 #N. Data channel signal demodulation sections 216 #1 to 216 #N demodulate the data channel signals based on the reported channel state. The demodulated data channel signals are subjected to channel decoding in channel decoding sections 217 #1 to 217 #N, and reconstructed back to user #1 to #k signals.

Feedback information demodulation sections 218 #1 to 218 #N demodulate information related to the channels (channel information), including, for example, feedback information such as the CQIs, PMIs, RI and PTI reported by the PUCCH, from information included in each control channel signal (for example, the PUCCH). The information demodulated in feedback information demodulation sections 218 #1 to 218 #N is output to PMI information extracting sections 219 #1 to 219 #N and CQI information extracting sections 222 #1 to 222 #N.

PMI information extracting sections 219 #1 to 219 #N extract PMI information from the information demodulated by feedback information demodulation sections 218 #1 to 218 #N. In this case, PMI information extracting sections 219 #1 to 219 #N extract PMI information designated by report 2 and report 3 included in the PUCCH, based on the last (the most recent) RI and PTI that were fed back. The PMI information here refers to WB-PMI 1 selected from the first codebook, and WB-PMI 2 and SB-PMI 2 selected from the second codebook W2. The extracted WB-PMI 1, WB-PMI 2 and SB-PMI 2 are output to the precoding weight generating section 220.

CQI information extracting sections 222 #1 to 222 #N extract CQI information from the information demodulated in feedback information demodulation sections 218 #1 to 218 #N. Here, the CQI information refers to WB-CQIs and SB-CQIs. The extracted WB-CQI and SB-CQI are output to channel coding sections 201 #1 to 201 #k and data modulation section 202 #1 to 202 #k, and used to select MCS for transmission data #1 to transmission data #k.

The precoding weight generating section 220 generates precoding weights that indicate the amounts of phase and/or amplitude shift for transmission data #1 to #k, based on WB-PMI 1, WB-PMI 2 and SB-PMI 2 that are output from PMI information extracting sections 219 #1 to 219 #N, and the RI. The generated precoding weights are output to precoding multiplying sections 203 #1 to 203 #k, and used in the precoding of transmission data #1 to transmission data #k.

In the mobile communication system 1 having this configuration, when the feedback method according to the first example is adopted in the mobile terminal apparatus 10, if the first feedback information selection section 109 selects 0 for the value of the PTI, in the multiplexer (MUX) 115, as illustrated in FIG. 6, for example, the transmission cycle or offset parameter of feedback information corresponding to report 2 and report 3 are made different from the transmission cycle or offset parameter of feedback information corresponding to report 2 and report 3 when PTI=1 and the former feedback information and the latter feedback information are multiplexed. By this means, it is possible to increase the frequency of feeding back WB-PMI 1 (report 2). For example, even in an environment where the channel quality in the system band changes fast, it is still possible to adequately select precoding weights that reflect the channel quality of the system band, so that it is possible to secure improvement of throughput performance.

In particular, when the feedback method according to the second example is adopted in the mobile terminal apparatus 10, if the first feedback information selection section 109 selects 0 for the value of the PTI, in the multiplexer (MUX) 115, as illustrated in FIG. 7 or FIG. 8, for example, feedback information for MU-MIMO is multiplexed on part of feedback information corresponding to report 3, so that it is possible to feed back PMIs that are required to perform MU-MIMO transmission, to the base station apparatus eNodeB, and, consequently, it is possible to adequately switch between SU-MIMO transmission and MU-MIMO transmission in the base station apparatus eNodeB, and secure improvement of throughput performance.

Furthermore, when the feedback method according to the third example is adopted in the mobile terminal apparatus 10, if the first feedback information section 109 selects 0 for the value of the PTI, in the multiplexer (MUX) 115, for example, as illustrated in FIG. 9, feedback information corresponding to report 2 and report 3 is multiplexed in a repetitive manner, so that it is possible to improve the received quality of feedback information corresponding to report 2 and report 3 in the base station apparatus eNodeB, and, consequently, it is possible to generate adequate precoding weights in the base station apparatus eNodeB and secure improvement of throughput performance.

Furthermore, when the feedback method according to the fourth example is adopted in the mobile terminal apparatus 10, if the first feedback information section 109 select 0 for the value of the PTI, in the multiplexer (MUX) 115, for example, as illustrated in FIG. 10, feedback information corresponding to report 3 is multiplexed on part of the subframes, so that it is possible to use other subframes on which the feedback information corresponding to report 3 is not multiplexed, for transmission of feedback information in other mobile terminal apparatuses UE, and, consequently, it is possible to secure improvement of overall system throughput performance by improving throughput performance in other mobile terminal apparatuses UE. Also, since feedback information corresponding to report 3 is multiplexed only on part of the subframes, it is possible to reduce the power consumption incurred by transmission of feedback information in the mobile terminal apparatus UE.

(Embodiment 2)

As described above, in feedback mode 2-1 in downlink MIMO transmission using eight transmitting antennas, precoding weights are determined from feedback information (three-subframe report) in three subframes that is adjusted based on the last (most recent) RI that was fed back. The precoding weights are generated by multiplying WB-PMI 1 that is included in the three-subframe report by WB-PMI 2 (or SB-PMI 2) (WB-PMI 1×WB-PMI 2 (or SB-PMI 2)). Consequently, it is not possible to generate precoding weights using only one of WB-PMI 1 and WB-PMI 2 (or SB-PMI 2).

In feedback mode 2-1 in downlink MIMO transmission using eight transmitting antennas, as shown in FIG. 5, it is possible to switch feedback information dynamically by changing the value of the PTI included in report 1. However, when the value of the PTI is changed from 0 to 1 and the rank which the RI indicates is also changed, the situation might occur where information related to WB-PMI 1 is missing, and therefore it is not possible to generate adequate precoding weights. The mobile terminal apparatus 10 and the base station apparatus 20 according to embodiment 2 prevent such situation from occurring and make it possible to generate precoding weights.

That is to say, in the mobile communication system 1 according to embodiment 2, in a mode to include and feed back a PTI to a base station apparatus 20 for downlink MIMO transmission using a plurality of transmitting antennas, when the value of the PTI is changed from 0 to 1, the same RI as the last RI that was fed back is selected, and that RI and the PTI after the change are multiplexed on a subframe.

As shown in FIG. 5, when the value of the PTI is changed from 0 to 1, if the rank which the RI indicates is changed, WB-PMI 1 is not multiplexed on a subframe when PTI=1, and therefore the situation might occur where WB-PMI 1 to match the rank after the change is not fed back to the base station apparatus. In the mobile communication system 1 according to embodiment 2, when the value of the PTI is changed from 0 to 1, the same RI as the last RI that was fed back is selected, and that RI and the PTI after the change are multiplexed on a subframe, so that it is possible to prevent the value of the PTI and the rank information indicated by the RI from changing at the same time, thus preventing the situation where WB-PMI 1 is missing and making it possible to generate precoding weights reliably, even in downlink MIMO transmission using a plurality of transmitting antennas.

In particular, in the mobile communication system 1 according to embodiment 2, it is preferable to use the last WB-PMI 1 that was fed back when the value of the PTI was 0, as WB-PMI 1, in the base station apparatus 20. In this case, it is possible to generate precoding weights based on WB-PMI 1 which reflects a channel state which resembles the current wideband channel state the most.

Furthermore, in the mobile communication system 1 according to embodiment 2, in a mode to include and feed back a PTI to a base station apparatus 20 for downlink MIMO transmission using a plurality of transmitting antennas, when a different RI from the last RI that was fed back is selected, 0 is selected for the value of the PTI, and that PTI and the RI after the change are multiplexed on a subframe.

As shown in FIG. 5, when a different RI from the last RI that was fed back is selected, if 1 is selected for the value of the PTI, WB-PMI 1 is not multiplexed on a subframe when PTI=1, and therefore the situation might occur where WB-PMI 1 to match the rank after the change is not fed back to the base station apparatus eNodeB. In the mobile communication system 1 according to embodiment 2, when a different RI from the last RI that was fed back is selected, 0 is selected for the value of the PTI, and that PTI and the RI after the change are multiplexed on a subframe, so that it is possible to prevent the value of the PTI and the rank information indicated by the RI from changing at the same time, thus preventing the situation where WB-PMI 1 is missing and making it possible to generate precoding weights reliably, even in downlink MIMO transmission using eight transmitting antennas.

Figure 14:
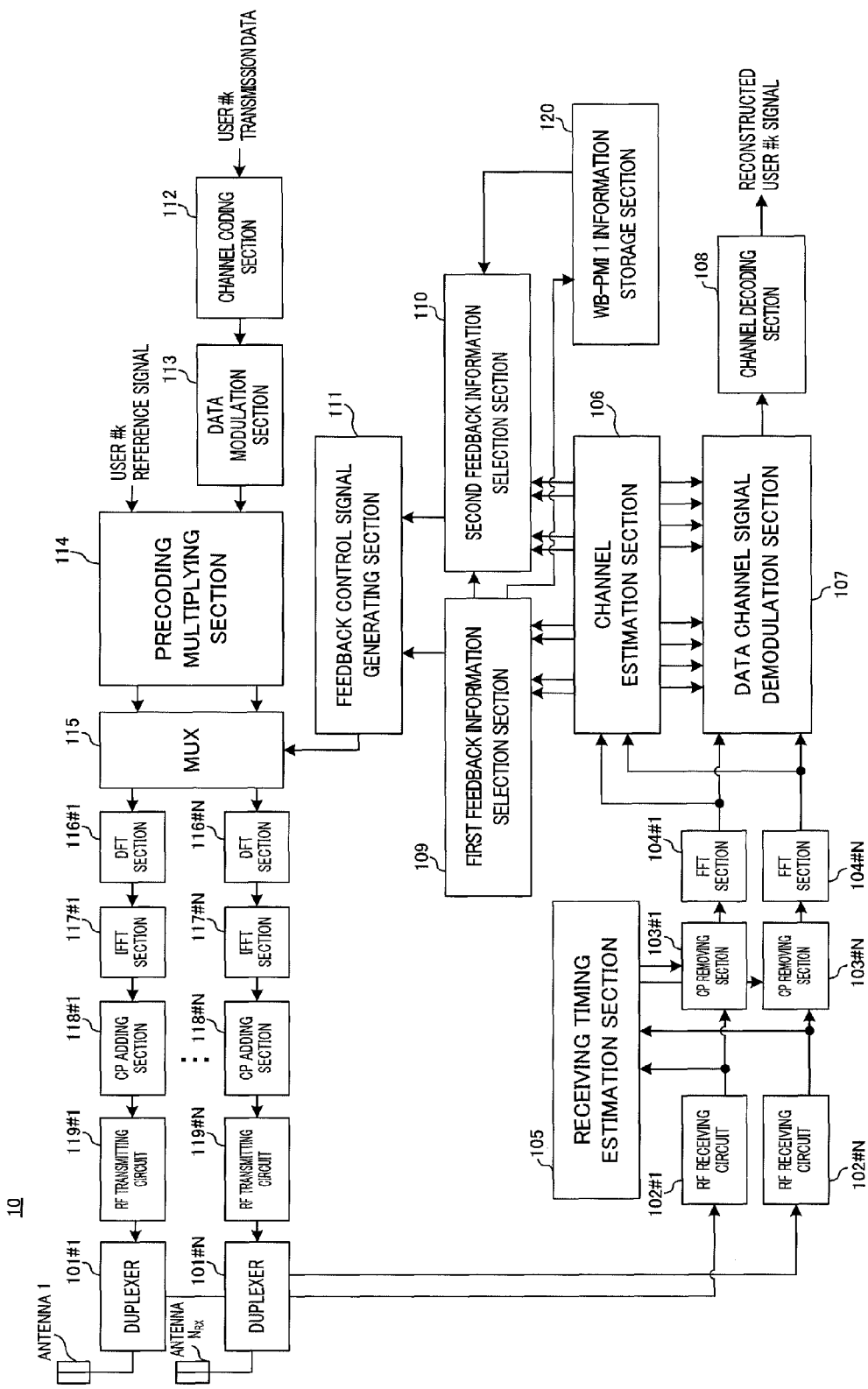
FIG. 14 is a block diagram showing a configuration of a mobile terminal apparatus according to embodiment 2 of the present invention.
Figure 15:
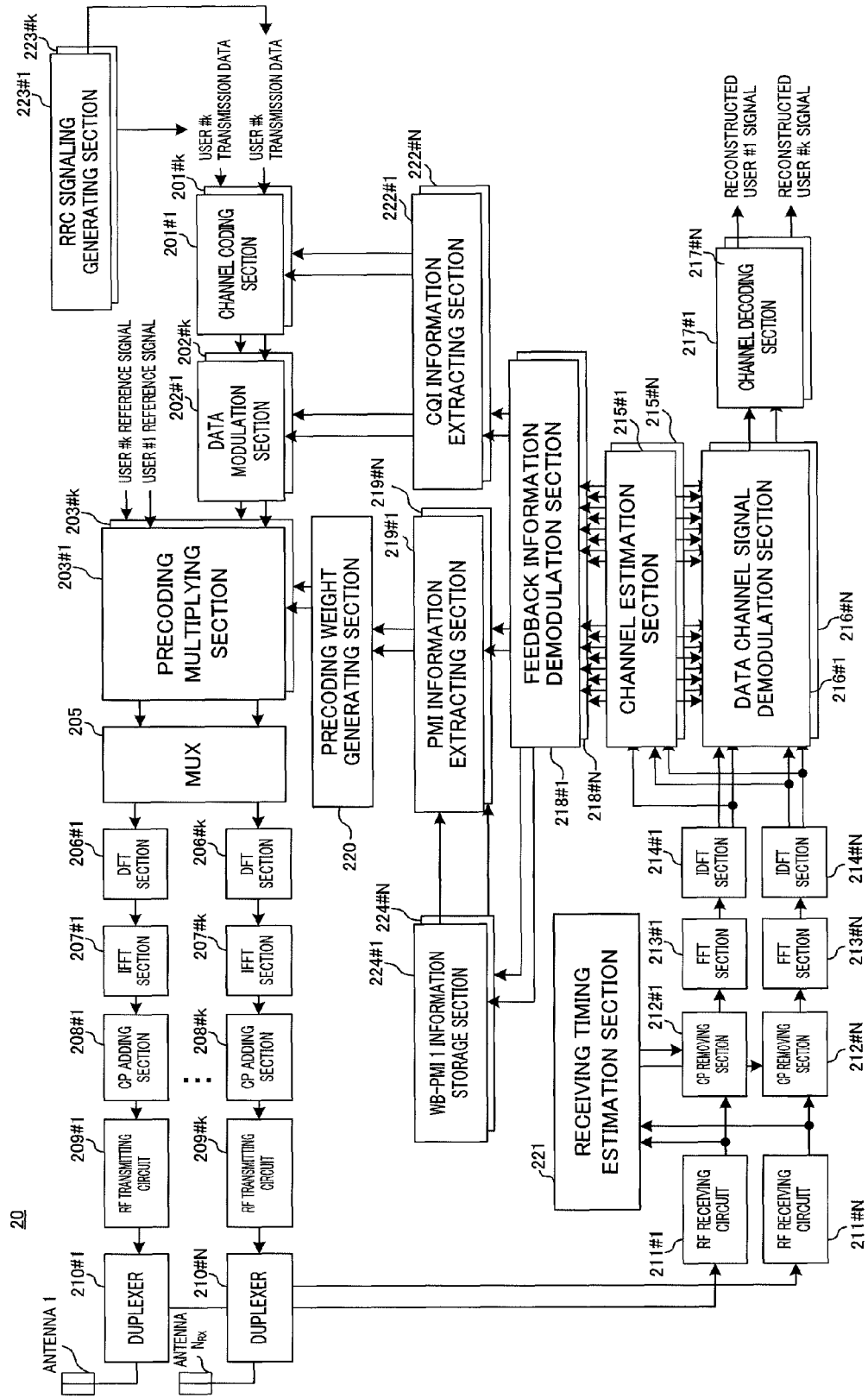
FIG. 15 is a block diagram showing a configuration of a radio base station apparatus according to embodiment 2.

FIG. 14 is a block diagram showing a configuration of a mobile terminal apparatus 10 according to embodiment 2 of the present invention. FIG. 15 is a block diagram showing a configuration of a base station apparatus 20 according to embodiment 2. Note that the configurations of the mobile terminal apparatus 10 and the base station apparatus 20 illustrated in FIG. 14 and FIG. 15 have configurations given by simplifying the present invention for ease of explanation, and both have configurations which a general mobile terminal apparatus and base station apparatus have.

The mobile terminal apparatus 10 shown in FIG. 14 is different from the mobile terminal apparatus 10 according to embodiment 1 mainly in that a WB-PMI 1 information storage section 120 is provided, that the first feedback information section 109 outputs WB-PMI 1 and so on to the WB-PMI 1 information storage section 120, and that the second feedback information selection section 110 selects feedback information based on WB-PMI 1 and so on stored in the WB-PMI 1 information storage section 120. The other configurations are common with the mobile terminal apparatus 10 according to embodiment 1, and their descriptions will be therefore omitted.

In the mobile terminal apparatus 10 shown in FIG. 14, when the value of the last PTI that was selected is 0 and the value of the PTI is changed to 1, the first feedback information section 109 selects the same RI as the last RI that was fed back. Also, when the first feedback information section 109 selects 0 for the value of the PTI when selecting a different RI from the last RI that was fed back.

Also, when the value of the PTI is 0 as a result of selecting the PTI, the first feedback information section 109 outputs the RI and WB-PMI 1 selected when the value of the PTI is 0, to the WB-PMI 1 information storage section 120. Also, the first feedback information section 109 reports the value of the selected PTI to the second feedback information selection section 110. Note that the first feedback information section 109 has the functions described with embodiment 1.

The WB-PMI 1 information storage section 120 stores the RI and WB-PMI 1 input from the first feedback information selection section 109. In the WB-PMI 1 information storage section 120, every time an RI and WB-PMI 1 are input from the first feedback information selection section 109, the values of the RI and WB-PMI 1 are updated, thus constantly providing a state where the latest RI and WB-PMI 1 are stored.

The second feedback information selection section 110 selects SB-PMI 2 and SB-CQIs based on the RI and WB-PMI 1 stored in WB-PMI 1 information storage section 120 when the value of the PTI reported from the first feedback information section 109 is 1. On the other hand, when the value of the PTI reported from the first feedback information section 109 is 0, SB-PMI 2 and SB-CQIs are selected based on the RI and WB-PMI 1 reported from the first feedback information section 109. Note that second feedback information selection section 110 has the functions described with embodiment 1.

The base station apparatus 20 illustrated in FIG. 15 is different from the base station apparatus 20 according to embodiment 1 mainly in that WB-PMI 1 information storage sections 224 #1 to 224 #N are provided, that feedback information demodulation sections 218 #1 to 218 #N output WB-PMI 1 to WB-PMI 1 information storage sections 224 #1 to 224 #N, and that PMI information extracting sections 219 #1 to 219 #N extract PMI information based on WB-PMI 1 stored in WB-PMI 1 information storage sections 224 #1 to 224 #N. The other configurations are common with the base station apparatus 20 according to embodiment 1, and their descriptions will be therefore omitted.

In the base station apparatus 20 illustrated in FIG. 15, feedback information demodulation sections 218 #1 to 218 #N, upon demodulating WB-PMI 1 reported by the PUCCH, outputs that WB-PMI 1 to WB-PMI 1 information storage sections 224 #1 to 224 #N. Note that feedback information demodulation sections 218 #1 to 218 #N have the functions described with embodiment 1.

WB-PMI 1 information storage sections 224 #1 to 224 #N store WB-PMI 1 that is input from feedback information demodulation sections 218 #1 to 218 #N. In WB-PMI 1 information storage sections 224 #1 to 224 #N, every time WB-PMI 1 is input from feedback information demodulation sections 218 #1 to 218 #N, the value of WB-PMI 1 is updated, thus constantly providing a state where the latest WB-PMI 1 is stored.

PMI information extracting sections 219 #1 to 219 #N extract WB-PMI 1 stored in WB-PMI 1 information storage sections 224 #1 to 224 #N as PMI information, when the value of the PTI reported from feedback information demodulation section 218 #1 to 218 #N is 1. On the other hand, when the value of the PTI reported from feedback information demodulation sections 218 #1 to 218 #N is 0, WB-PMI 1 reported from feedback information demodulation sections 218 #1 to 218 #N is extracted as PMI information. Note that PMI information extracting sections 219 #1 to 219 #N have the functions described with embodiment 1.

In the mobile communication system 1 having this configuration, when the value of the PTI is changed from 0 to 1, the same RI as the last RI that was fed back is selected in the first feedback information selection section 109, and that RI and the PTI after the change are multiplexed on a subframe in the multiplexer 115, so that it is possible to prevent the value of the PTI and the rank information indicated by the RI from changing at the same time, thus preventing the situation where WB-PMI 1 is missing, and making it possible to generate precoding weights reliably, in the base station apparatus 20, even in downlink MIMO transmission using a plurality of transmitting antennas.

In particular, in the base station apparatus 20, when the value of the PTI reported from feedback information demodulation sections 218 #1 to 218 #N is 1, PMI information extracting sections 219 #1 to 219 #N extract WB-PMI 1 (the last WB-PMI 1 that was fed back when the value of the PTI was 0) stored in WB-PMI 1 information storage sections 224 #1 to 224 #N, as PMI information, which is then used to generate precoding weights. By this means, it is possible to generate precoding weights based on WB-PMI 1 that reflects a channel state which resembles the current wideband channel state the most.

Also, in the mobile terminal apparatus 10, when a different RI from the last RI that was fed back is selected, 0 is selected for the value of the PTI in the first feedback information selection section 109, and that PTI and the RI after the change are multiplexed on a subframe in the multiplexer 115, so that it is possible to prevent the value of the PTI and the rank information indicated by the RI from changing at the same time, thus preventing the situation where WB-PMI 1 is missing, and making it possible to generate precoding weights reliably, in the base station apparatus 20, even in downlink MIMO transmission using eight transmitting antennas.

Note that, in the mobile communication system 1 according to embodiment 2, in a mode to include and feed back a PTI to a base station apparatus 20 for downlink MIMO transmission using a plurality of transmitting antennas (for example, eight transmitting antennas), virtual PMIs to be used as WB-PMI 1 are stored in advance in the base station apparatus 20 in accordance with the RI, and, when a different RI from the last RI that was fed back is selected and 1 is selected for the value of the PTI in a mobile terminal apparatus 10, it is equally possible to multiplex the RI after the change and the PTI on a subframe, transmit the multiplex signal to the base station apparatus 20 through the physical uplink control channel (PUCCH), and use a virtual PMI to match the RI after the change to generate precoding weights.

In this case, it is possible to store PMIs as virtual PMIs in the base station apparatus 20, that assume, for example, WB-PMI 1 to be 0 when the rank which the RI after the change indicates is rank 1 or rank 2, assume WB-PMI 1 to be 1 when the rank which the RI after the change indicates is rank 3 or rank 4, and assume WB-PMI 1 to be 2 when the rank which the RI after the change indicates is rank 5 to rank 8. These virtual PMIs are stored in advance in, for example, WB-PMI 1 information storage sections 224 #1 to 224 #N. When PMI information extracting sections 219 #1 to 219 #N detect that a different RI from the last RI that was fed back is selected and 1 is selected for the value of the PTI, based on information from feedback information demodulation sections 218 #1 to 218 #N, PMI information extracting sections 219 #1 to 219 #N detect a virtual PMI to match the RI after the change as WB-PMI 1 and output this to the precoding weight generating section 220. That is to say, the precoding weight generating section 220 uses a virtual PMI as WB-PMI 1 to generate precoding weights.

As shown in FIG. 5, when a different RI from the last RI that was fed back is selected, if 1 is selected for the value of the PTI, WB-PMI 1 is not multiplexed on a subframe when PTI=1, and therefore the situation might occur where WB-PMI 1 to match the rank information after the change is not fed back to the base station apparatus 20. As described earlier, when a different RI from the last RI that was fed back is selected and 1 is selected for the value of the PTI, it is possible to prevent the situation where WB-PMI 1 to match the RI after the change is missing, by using a virtual PMI corresponding to WB-PMI 1 to match the RI after the change to generate precoding weights, so that it is possible to generate precoding weights reliably in the base station apparatus 20 even in downlink MIMO transmission using eight transmitting antennas.

Also, in the mobile communication system 1 according to embodiment 1, in a mode to include and feed back a PTI to the base station apparatus 20 for downlink MIMO transmission using a plurality of transmitting antennas (for example, eight transmitting antennas), virtual PMIs to be as WB-PMI 1 are stored in advance in the base station apparatus 20 in accordance with the RI, and the last RI and WB-PMI 1 that were fed back, and, when a different RI from the last RI that was fed back is selected and 1 is selected for the value of the PTI in the mobile terminal apparatus 10, it is equally possible to multiplex the RI and PTI after the change on a subframe, transmit the multiplex signal to the base station apparatus by a physical uplink control channel, and use a virtual PMI to match the last RI and WB-PMI 1 that were fed back, to generate precoding weights.

In this case, in the base station apparatus 20, it is possible to store, as virtual PMIs, for example, PMIs that assume WB-PMI 1 to be 0 when the RI after the change is rank 1 to rank 8, the last RI that was fed back is rank 1 to rank 8 and the last WB-PMI 1 that was fed back is 0, and assume WB-PMI 1 to be 1 when the RI after the change is rank 1 to rank 4, the last RI that was fed back is rank 1 or rank 2, and the last WB-PMI 1 that was fed back is 1. Likewise, it is also possible to store PMIs that assume WB-PMI 1 to be 2 when the RI after the change is rank 1 to rank 4, the last RI that was fed back is rank 3 or rank 4, and the last WB-PMI 1 that was fed back is 1, and assume WB-PMI 1 to be 4 when the RI after the change is rank 1 to rank 4, the last RI that was fed back is rank 5 to rank 8, and the last WB-PMI 1 that was fed back is 1. Also, it is equally possible to store PMIs that assume WB-PMI 1 to be 0 when the RI after the change is rank 5 to rank 8, the last RI that was fed back is rank 1 or rank 2, and the last WB-PMI 1 that was fed back is 1, assume WB-PMI 1 to be 1 when the RI after the change is rank 5 to rank 8, the last RI that was fed back is rank 3 or rank 4, and the last WB-PMI 1 that was fed back is 1, and assume WB-PMI 1 to be 2 when the RI after the change is rank 5 to rank 8, the last RI that was fed back is rank 5 to rank 8, and the last WB-PMI 1 that was fed back is 1. These virtual PMIs are stored in, for example, WB-PMI 1 information storage sections 224 #1 to 224 #N. When PMI information extracting sections 219 #1 to 219 #N detect that a different RI from the last RI that was fed back is selected and 1 is selected for the value of the PTI, based on information from feedback information demodulation sections 218 #1 to 218 #N, PMI information extracting sections 219 #1 to 219 #N extract a virtual PMI corresponding to the last RI and WB-PMI 1 that were fed back, as WB-PMI 1, and output this to the precoding weight generating section 220. That is to say, in the precoding weight generating section 220, a virtual PMI is used as WB-PMI 1 to generate precoding weights.

As shown in FIG. 5, when a different RI from the last RI that was fed back is selected and 1 is selected for the value of the PTI, if 1 is selected for the value of the PTI, WB-PMI 1 is not multiplexed on a subframe when PTI=1, and therefore the situation might occur where WB-PMI 1 to match the rank after the change is not fed back to the base station apparatus 20. As described above, when a different RI from the last RI that was fed back is selected and 0 is selected for the value of the PTI, it is possible to prevent the situation where WB-PMI 1 to match the RI after the change is missing, by using a virtual PMI to match the RI after the change and WB-PMI 1 corresponding to the last RI and WB-PMI 1 that were fed back, so that it is possible to generate precoding weights reliably, in the base station apparatus 20, even in downlink MIMO transmission using eight transmitting antennas.

Now, although the present invention has been described in detail with reference to the above embodiments, it should be obvious to a person skilled in the art that the present invention is by no means limited to the embodiments described in this specification. The present invention can be implemented with various corrections and in various modifications, without departing from the spirit and scope of the present invention defined by the recitations of the claims. Consequently, the descriptions in this specification are provided only for the purpose of explaining examples, and should by no means be construed to limit the present invention in any way.

For example, although cases have been described in the above descriptions where the base station apparatus 20 has eight transmitting antennas, in an example to include and feed back a PTI in a physical uplink control channel (PUCCH), the present invention is by no means limited to this, regarding the configuration of the base station apparatus 20 to which the present invention is applied. For example, cases where the base station apparatus 20 has two transmitting antennas or four transmitting antennas are equally applicable.

The disclosure of Japanese Patent Application No. 2010-224821, filed on Oct. 4, 2010, including the specification, drawings and abstract, is incorporated herein by reference in its entirety.

The invention is:

1. A feedback method in an LTE-A (Long Term Evolution-Advanced) system of including a PTI (Precoder Type Indicator) in a physical uplink control channel and feeding back the PTI to a radio base station apparatus for downlink MIMO (Multi Input Multi Output) transmission using a plurality of transmitting antennas, the feedback method comprising the steps of:

in a mobile terminal apparatus, making a transmission cycle of feedback information corresponding to report 2 and report 3 when a value of the PTI is 0 different from a transmission cycle of feedback information corresponding to report 2 and report 3 when PTI=1 and multiplexing the former feedback information and the latter feedback information; and transmitting the multiplexed signal to the radio base station apparatus by the physical uplink control channel.

2. The feedback method according to claim 1, wherein an offset parameter or a transmission cycle is adjusted such that multiplexing is performed on a subframe that is common with a subframe on which report 2 or report 3 is multiplexed when the value of the PTI is 1.

3. A feedback method in an LTE-A (Long Term Evolution-Advanced) system of including a PTI (Precoder Type Indicator)in a physical uplink control channel and feeding back the PTI to a radio base station apparatus for downlink MIMO (Multi Input Multi Output) transmission using a plurality of transmitting antennas, the feedback method comprising the steps of:

in a mobile terminal apparatus, multiplexing feedback information corresponding to report 2 and report 3 when the value of the PTI is 0 in a repetitive manner; and transmitting the multiplexed signal to the radio base station apparatus by the physical uplink control channel.

4. The feedback method according to claim 1, wherein, in the mobile terminal apparatus, when the value of the PTI is changed from 0 to 1, the same RI (Rank Indicator) as a last RI that was fed back is selected, the selected RI and the PTI after the change are multiplexed on a subframe, and the multiplexed signal is transmitted to the radio base station apparatus by the physical uplink control channel.

5. The feedback method according to claim 1, wherein, in the mobile terminal apparatus, when a different RI from the last RI that was fed back is selected, 0 is selected for the value of the PTI, the PTI and the RI after the change are multiplexed on a subframe, and the multiplexed signal is transmitted to the radio base station apparatus by the physical uplink control channel.

6. A mobile terminal apparatus in an LTE-A (Long Term Evolution-Advanced) system comprising:

a multiplexing section configured to, in a mode to include a PTI (Precoder Type Indicator) in a physical uplink control channel and feedback the PTI to a radio base station apparatus for downlink MIMO (Multi Input Multi Output) transmission using a plurality of transmitting antennas, make a transmission cycle of feedback information corresponding to report 2 and report 3 when a value of the PTI is 0 different from a transmission cycle of feedback information corresponding to report 2 and report 3 when PTI=1 and multiplex the former feedback information and the latter feedback information; and a transmission section configured to transmit the multiplexed signal to the radio base station apparatus by the physical uplink control channel.

7. A mobile terminal apparatus in an LTE-A (Long Term Evolution-Advanced) system comprising:
   a multiplexing section configured to, in a mode to include a PTI (Precoder Type Indicator) in a physical uplink control channel and feedback the PTI to a radio base station apparatus for downlink MIMO (Multi Input Multi Output) transmission using a plurality of transmitting antennas, multiplex feedback information corresponding to report 2 and report 3 when the value of the PTI is 0 in a repetitive manner; and
   a transmission section configured to transmit the multiplexed signal to the radio base station apparatus by the physical uplink control channel.

8. The feedback method according to claim 2, wherein, in the mobile terminal apparatus, when the value of the PTI is changed from 0 to 1, the same RI (Rank Indicator) as a last RI that was fed back is selected, the selected RI and the PTI after the change are multiplexed on a subframe, and the multiplexed signal is transmitted to the radio base station apparatus by the physical uplink control channel.

9. The feedback method according to claim 2, wherein, in the mobile terminal apparatus, when a different RI from the last RI that was fed back is selected, 0 is selected for the value of the PTI, the PTI and the RI after the change are multiplexed on a subframe, and the multiplexed signal is transmitted to the radio base station apparatus by the physical uplink control channel.

10. The feedback method according to claim 3, wherein, in the mobile terminal apparatus, when the value of the PTI is changed from 0 to 1, the same RI (Rank Indicator) as a last RI that was fed back is selected, the selected RI and the PTI after the change are multiplexed on a subframe, and the multiplexed signal is transmitted to the radio base station apparatus by the physical uplink control channel.

11. The feedback method according to claim 3, wherein, in the mobile terminal apparatus, when a different RI from the last RI that was fed back is selected, 0 is selected for the value of the PTI, the PTI and the RI after the change are multiplexed on a subframe, and the multiplexed signal is transmitted to the radio base station apparatus by the physical uplink control channel.

* * * * *